US012720106B2

(12) United States Patent
Jeong et al.

(10) Patent No.: US 12,720,106 B2
(45) **Date of Patent: *Aug. 25, 2026**

(54) APPARATUS AND METHOD FOR ENCODING AND DECODING MOTION INFORMATION BY USING NEIGHBORING MOTION INFORMATION

(71) Applicant: SAMSUNG ELECTRONICS CO., LTD., Suwon-si (KR)

(72) Inventors: Seungsoo Jeong, Suwon-si (KR); Minwoo Park, Suwon-si (KR); Minsoo Park, Suwon-si (KR); Kiho Choi, Suwon-si (KR); Narae Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/950,428

(22) Filed: Nov. 18, 2024

(65) Prior Publication Data

US 2025/0080770 A1 Mar. 6, 2025

Related U.S. Application Data

(63) Continuation of application No. 17/552,000, filed on Dec. 15, 2021, now Pat. No. 12,192,512, which is a (Continued)

(51) Int. Cl.
*H04N 19/573* (2014.01)
*H04N 19/105* (2014.01)
(Continued)

(52) U.S. Cl.
CPC ......... *H04N 19/573* (2014.11); *H04N 19/105* (2014.11); *H04N 19/139* (2014.11);
(Continued)

(58) Field of Classification Search
CPC .. H04N 19/573; H04N 19/105; H04N 19/139; H04N 19/176; H04N 19/117; H04N 19/70
(Continued)

(56) References Cited

U.S. PATENT DOCUMENTS 9,467,694 B2 10/2016 Yu et al.
9,854,266 B2 12/2017 Takehara et al.
(Continued)

FOREIGN PATENT DOCUMENTS

CN 103096071 A 5/2013
CN 105247869 A 1/2016
(Continued)

OTHER PUBLICATIONS

Office Action dated Nov. 26, 2024, issued by Mexican Patent Office in Mexican Patent Application No. MX/a/2021/014762.
(Continued)

*Primary Examiner* — Allen C Wong
(74) *Attorney, Agent, or Firm* — Sughrue Mion, PLLC

(57) ABSTRACT

A method of decoding motion information may include: obtaining, from a bitstream, change information indicating whether to change motion information of a neighboring block; when the change information indicates a change of the motion information and a higher block is able to use one reference picture list, identifying the number of pictures included in the reference picture list of the current block; selecting, as a reference picture of the current block, a reference picture of the neighboring block based on the number of pictures; when the reference picture of the
(Continued)

neighboring block is selected as the reference picture of the current block, obtaining a motion vector of the current block by applying an offset to a motion vector of the neighboring block; and reconstructing the current block by using a reference block indicated by the motion vector of the current block in the reference picture of the current block.

5 Claims, 33 Drawing Sheets

Related U.S. Application Data continuation of application No. PCT/KR2020/007968, filed on Jun. 19, 2020.

(60) Provisional application No. 62/906,895, filed on Sep. 27, 2019, provisional application No. 62/864,822, filed on Jun. 21, 2019.

(51) Int. Cl.
*H04N 19/139* (2014.01)
*H04N 19/176* (2014.01)
*H04N 19/117* (2014.01)
*H04N 19/70* (2014.01)

(52) U.S. Cl.
CPC ......... *H04N 19/176* (2014.11); *H04N 19/117* (2014.11); *H04N 19/70* (2014.11)

(58) Field of Classification Search
USPC ...................................................... 375/240.16
See application file for complete search history.

(56) References Cited

U.S. PATENT DOCUMENTS 10,812,791 B2 10/2020 Chien et al.
11,172,204 B2 11/2021 Jeong
2004/0076237 A1 4/2004 Kadono et al.
2008/0181309 A1* 7/2008 Lee ...................... H04N 19/197 375/E7.123
2012/0013281 A1 1/2012 Watanabe
2012/0213281 A1 8/2012 Choi et al.
2013/0022118 A1 1/2013 Kim et al.
2014/0241434 A1* 8/2014 Lin ...................... H04N 19/597 375/240.16
2016/0100187 A1 4/2016 Lee et al.
2017/0339425 A1 11/2017 Jeong et al.
2018/0098085 A1 4/2018 Panusopone et al.
2018/0176596 A1 6/2018 Jeong et al.
2018/0376165 A1 12/2018 Alshin et al.
2019/0335178 A1 10/2019 Oh et al.
2021/0385462 A1* 12/2021 Deng ................... H04N 19/105
2022/0224908 A1* 7/2022 Kim ..................... H04N 19/176
2024/0259584 A1 8/2024 Lim et al.
2024/0333966 A1 10/2024 Nakagami

FOREIGN PATENT DOCUMENTS

CN 107113443 A 8/2017
CN 107888916 A 4/2018
CN 109691106 A 4/2019
EP 2 664 142 A1 11/2013
EP 3 174 297 A1 5/2017
EP 3 996 371 A1 5/2022
KR 10-2008-0015760 A 2/2008
KR 10-1607038 B1 4/2016
KR 10-2016-0143584 A 12/2016
KR 10-2018-0112125 A 10/2018
KR 10-2019-0069830 A 6/2019
WO 2012/095466 A1 7/2012
WO 2013/053309 A1 4/2013

OTHER PUBLICATIONS

Communication issued May 2, 2025 by the Intellectual Property Office of Australia in Australian Patent Application No. 2020297835.
Communication issued Mar. 24, 2025 by the Chinese Patent Office in Chinese Patent Application No. 202080044983.2.
Communication issued May 6, 2025 by the European Patent Office in European Patent Application No. 20826828.4.
Communication dated Feb. 28, 2024, issued by the India Intellectual Property Office in Indian Patent Application No. 202127060376.
Communication dated Nov. 23, 2020, issued by the Korean Intellectual Property Office in Korean Patent Application No. 10-2020-0074957.
Communication dated Sep. 17, 2020, issued by the International Searching Authority in counterpart International Application No. PCT/KR2020/007968 (PCT/ISA/220, 210, 237).
Communication issued Apr. 23, 2024 by the Korean Patent Office for KR Patent Application No. 10-2021-0160716.
Communication issued on Sep. 20, 2024 issued by the Taiwanese Patent Office in corresponding TW Patent Application No. 109121036.
Extended European Search Report dated Mar. 14, 2023, issued by European Patent Office in European Application No. 20826828.4.
Hashimoto et al., "CE4: Enhanced Merge with MVD(Test 4.4.4)", JVET-M0060_WD, Joint Video Experts Team of ITU-T SG 16 WP 3 and ISO/IEC JTC 1/SC 29/WG 11, Dec. 28, 2018, (17 total pages).
Office Action issued on Oct. 30, 2024 by the Chinese Patent Office in corresponding CN Patent Application No. 202080044983.2.
Bross et al., "Versatile Video Coding (Draft 5)," JVET-N1001-v8, Joint Video Experts Team (JVET) of ITU-T SG 16 WP 3 and ISO/IEC JTC 1/SC 29/WG 11, Jun. 11, 2019, total 399 pages.
Choi et al., "Working Draft 1 of Essential Video Coding", ISO/IEC JTC 1/SC 29/WG 11, N18283, Jan. 2019, (208 total pages).
Choi et al., "Working Draft 2 of Essential Video Coding," ISO/IEC JTC 1/SC 29/WG 11, N18448, May 17, 2019, total 235 pages.
Communication dated Apr. 6, 2021, issued by the Korean Intellectual Property Office in Korean Patent Application No. 10-2021-0022595.
Communication dated Aug. 13, 2020, issued by the Korean Intellectual Property Office in Korean Patent Application No. 10-2020-0074957.
Communication dated Aug. 24, 2021, issued by the Korean Intellectual Property Office in Korean Patent Application No. 10-2021-0022595.
Communication dated Dec. 12, 2023, issued by the Taiwan Intellectual Property Office in counterpart Taiwanese Application No. 109121036.
Communication dated Jun. 20, 2025, issued by the National Intellectual Property Administration, PRC in Chinese Application No. 202080044983.2.

* cited by examiner

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 14

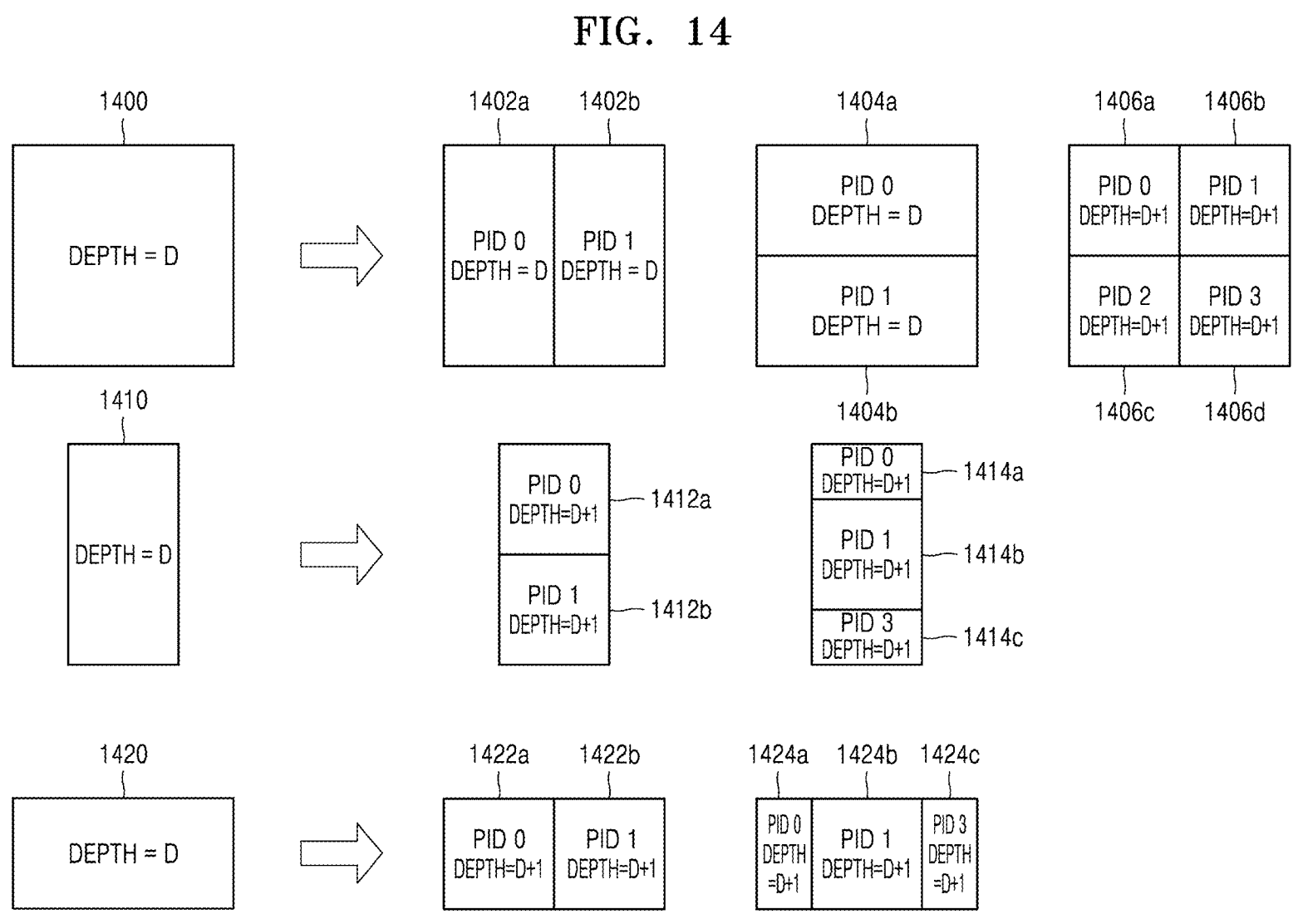

1400 DEPTH = D
1402a PID 0 DEPTH = D
1402b PID 1 DEPTH = D
1404a PID 0 DEPTH = D
1404b PID 1 DEPTH = D
1406a PID 0 DEPTH=D+1
1406b PID 1 DEPTH=D+1
1406c PID 2 DEPTH=D+1
1406d PID 3 DEPTH=D+1

1410 DEPTH = D
1412a PID 0 DEPTH=D+1
1412b PID 1 DEPTH=D+1
1414a PID 0 DEPTH=D+1
1414b PID 1 DEPTH=D+1
1414c PID 3 DEPTH=D+1

1420 DEPTH = D
1422a PID 0 DEPTH=D+1
1422b PID 1 DEPTH=D+1
1424a PID 0 DEPTH =D+1
1424b PID 1 DEPTH=D+1
1424c PID 3 DEPTH =D+1

FIG. 17

| SQUARE BLOCK | |
| --- | --- |
| (00)b | |
| (01)b | |
| (10)b | |
| (11)b | |

| NON-SQUARE BLOCK | |
| --- | --- |
| (0)b | |
| (10)b | |
| (11)b | |

FIG. 18

| SQUARE BLOCK | |
|---|---|
| (00)b | |
| (10)b | |
| (11)b | |

| NON-SQUARE BLOCK | | |
|---|---|---|
| (0)b | | |
| (10)b | | |
| (11)b | | |

Figure 19:
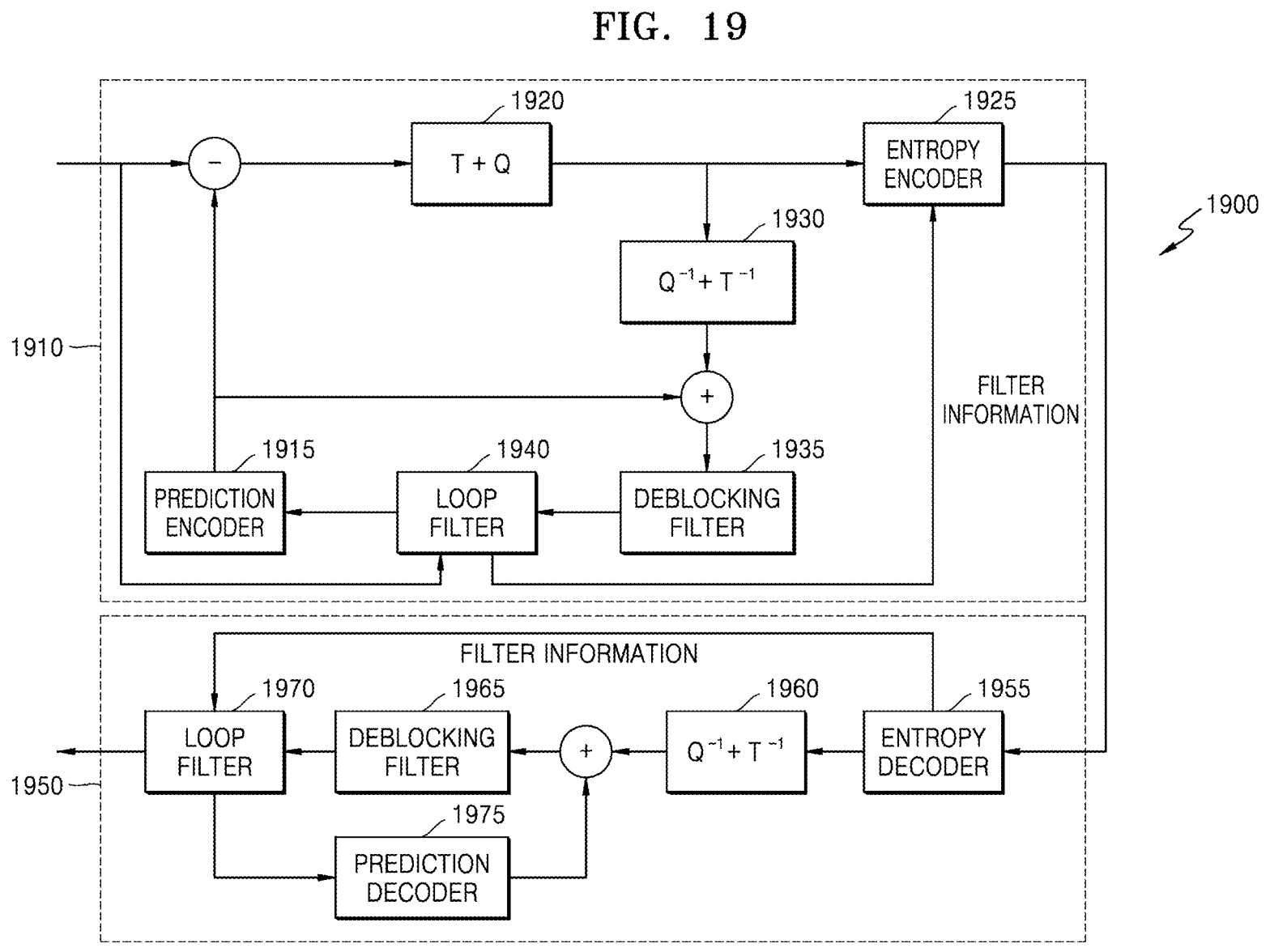

1915 PREDICTION ENCODER

1920 T + Q

1925 ENTROPY ENCODER

1930 $Q^{-1} + T^{-1}$

1935 DEBLOCKING FILTER

1940 LOOP FILTER

FILTER INFORMATION

1950

1955 ENTROPY DECODER

1960 $Q^{-1} + T^{-1}$

1965 DEBLOCKING FILTER

1970 LOOP FILTER

1975 PREDICTION DECODER

FILTER INFORMATION

FIG. 22

| PREDICTION DIRECTION OF NEIGHBORING BLOCK | L0 | L1 | Bi |
|---|---|---|---|
| mmvd_group_idx == 0 | L0 | L1 | Bi |
| mmvd_group_idx == 1 | Bi | Bi | L0 |
| mmvd_group_idx == 2 | L1 | L0 | L1 |

FIG. 23

| REFERENCE PICTURE LIST 0 | |
|---|---|
| Index 0 | POC 3 |
| Index 1 | POC 6 |

| REFERENCE PICTURE LIST 1 | |
|---|---|
| Index 0 | POC 2 |
| Index 1 | POC 7 |

FIG. 27

| mmvd_distance_idx[x0][y0] | MmvdDistance[x0][y0] |
|---|---|
| 0 | 1 |
| 1 | 2 |
| 2 | 4 |
| 3 | 8 |
| 4 | 16 |
| 5 | 32 |
| 6 | 64 |
| 7 | 128 |

FIG. 28

| mmvd_direction_idx[x0][y0] | MmvdSign[x0][y0][0] | MmvdSign[x0][y0][1] |
|---|---|---|
| 0 | +1 | 0 |
| 1 | −1 | 0 |
| 2 | 0 | +1 |
| 3 | 0 | −1 |

FIG. 29

| mmvd_group_idx == 0 | ref_idx=ref_idx_curr |
|---|---|
| mmvd_group_idx == 1 | ref_idx=Active reference number == 1? ref_idx_curr : !ref_idx_curr |
| mmvd_group_idx == 2 | ref_idx=Active reference number < 3 ? ref_idx_curr : ref_idx_curr < 2? 2:1 |

APPARATUS AND METHOD FOR ENCODING AND DECODING MOTION INFORMATION BY USING NEIGHBORING MOTION INFORMATION

CROSS-REFERENCE TO RELATED APPLICATION

This application is a continuation application of U.S. patent application Ser. No. 17/552,000, filed Dec. 15, 2021, which is a bypass continuation application of International Application No. PCT/KR2020/007968 filed on Jun. 19, 2020 which claims priority to U.S. Provisional Patent Application Nos. 62/864,822 filed on Jun. 21, 2019, and 62/906,895 filed on Sep. 27, 2019 in the United States Patent and Trademark Office, the disclosures of which are incorporated herein by reference in their entireties.

BACKGROUND

1. Field

The disclosure relates to encoding and decoding fields of an image. In particular, the disclosure relates to an apparatus and method for encoding and decoding current motion information by using neighboring motion information.

2. Description of the Related Art

In encoding and decoding of an image, the image may be split into blocks and each block may be prediction-encoded and prediction-decoded via inter prediction or intra prediction.

A representative example of inter prediction is motion estimation encoding using a method of compressing an image by removing temporal redundancy between images. In motion estimation encoding, blocks of a current image are predicted by using at least one reference image. A reference block most similar to a current block may be searched for in a certain search range by using a certain evaluation function. The current block is predicted based on the reference block and a residual block is generated by subtracting a prediction block generated as a result of the prediction from the current block and then encoded. Here, to further accurately perform the prediction, interpolation is performed on the at least one reference image so as to generate pixels of sub pel units smaller than integer pel units and inter prediction may be performed based on the pixels of sub pel units.

In the codec such as H.264 advanced video coding (AVC) and high efficiency video coding (HEVC), motion vectors of pre-encoded blocks adjacent to a current block or blocks included in a pre-encoded image are used to predict a motion vector of the current block. A differential motion vector that is a difference between the motion vector of the current block and the motion vector of the pre-encoded block is signaled to a decoder via a certain method.

SUMMARY

One or more embodiments provide an apparatus and a method for encoding motion information and an apparatus and a method for decoding motion information, which respectively encode and decode current motion information with a small number of bits by changing neighboring motion information.

According to an embodiment of the disclosure, a method of decoding motion information by a decoding apparatus may include: based on a size of a current block being greater than a pre-set size, obtaining, from a bitstream, change information indicating whether to change motion information of a neighboring block temporally or spatially related to the current block; based on the change information indicating that a change of the motion information and a higher block of the current block is able to use one reference picture list, identifying a number of pictures included in the reference picture list of the current block; selecting, as a reference picture of the current block, a reference picture of the neighboring block or a picture different from the reference picture of the neighboring block, based on the identified number of pictures; based on the reference picture of the neighboring block being selected as the reference picture of the current block, obtaining a motion vector of the current block by applying an offset to at least one of an x-component or a y-component of a motion vector of the neighboring block; and reconstructing the current block by using a reference block indicated by the motion vector of the current block in the reference picture of the current block.

The selecting may include: based on the identified number of pictures being 1, selecting the reference picture of the neighboring block as the reference picture of the current block.

Based on the change information indicating a first type change, the offset may have a positive sign; and based on the change information indicating a second type change, the offset may have a negative sign.

Based on the identified number of pictures being 2, and the change information indicating a first type change, the selecting may include selecting the picture different from the reference picture of the neighboring block as the reference picture of the current block. The obtaining of the motion vector of the current block may include obtaining the motion vector of the current block by scaling the motion vector of the neighboring block according to a ratio of a picture order count (POC) distance between a current picture and the reference picture of the neighboring block to a POC distance between the current picture and the reference picture of the current block.

Based on the identified number of pictures being 2, and the change information indicating a second type change, the selecting may include selecting the reference picture of the neighboring block as the reference picture of the current block. The obtaining of the motion vector of the current block may include obtaining the motion vector of the current block by applying the offset to at least one of the x-component or the y-component of the motion vector of the neighboring block.

Based on the identified number of pictures being 3 or more, the selecting may include selecting the picture different from the reference picture of the neighboring block as the reference picture of the current block. The obtaining of the motion vector of the current block may include obtaining the motion vector of the current block by scaling the motion vector of the neighboring block according to a ratio of a POC distance between a current picture and the reference picture of the neighboring block to a POC distance between the current picture and the reference picture of the current block.

Based on the identified number of pictures being 3 or more, and the change information indicating a first type change, the selecting may include selecting, as the reference picture of the current block, the picture different from the reference picture of the neighboring block from among the pictures included in the reference picture list.

Based on the identified number of pictures being 3 or more, and the change information indicating a second type change, the selecting may include: selecting a picture of an index of 2 as the reference picture of the current block from among the pictures included in the reference picture list when an index indicating the reference picture of the neighboring block is smaller than 2; and selecting a picture of an index of 1 as the reference picture of the current block from among the pictures included in the reference picture list when the index indicating the reference picture of the neighboring block is equal to or greater than 2.

The obtaining of the motion vector of the current block may include obtaining the motion vector of the current block by adding a differential motion vector obtained from the bitstream to the motion vector of the neighboring block to which the offset is applied.

The differential motion vector may be calculated from variation distance information and variation direction information included in the bitstream.

The variation distance information may indicate a variation distance of $2^n$, wherein n is an integer equal to or greater than 0, and the offset is an odd number.

Based on the change information indicating an non-change of the motion information, the selecting may include selecting the reference picture of the neighboring block as the reference picture of the current block. The obtaining of the motion vector of the current block may include obtaining the motion vector of the current block by applying, to the motion vector of the neighboring block, a differential motion vector obtained from the bitstream.

Based on the size of the current block being smaller than or equal to the pre-set size, omitting to obtain the change information. The selecting may include selecting the reference picture of the neighboring block as the reference picture of the current block. The obtaining of the motion vector of the current block may include obtaining the motion vector of the current block by applying, to the motion vector of the neighboring block, a differential motion vector obtained from the bitstream.

According to another embodiment of the disclosure, an apparatus for decoding motion information may include one or more processors configured to: obtain, from a bitstream, change information indicating whether to change motion information of a neighboring block temporally or spatially related to a current block; based on the change information indicating that a change of the motion information and a higher block including the current block is able to use one reference picture list, identify a number of pictures included in the reference picture list of the current block; select, as a reference picture of the current block, a reference picture of the neighboring block or a picture different from the reference picture of the neighboring block according to the identified number of pictures; based on the reference picture of the neighboring block being selected as the reference picture of the current block, obtain a motion vector of the current block by applying an offset to at least one of an x-component or a y-component of a motion vector of the neighboring block; and reconstruct the current block by using a reference block indicated by the motion vector of the current block in the reference picture of the current block.

The one or more processors may be further configured to: based on the identified number of pictures being 1, select the reference picture of the neighboring block as the reference picture of the current block.

Based on the change information indicating a first type change, the offset may have a positive sign; and based on the change information indicating a second type change, the offset may have a negative sign.

The one or more processors may be further configured to: based on the identified number of pictures being 2, and the change information indicating a first type change, select the picture different from the reference picture of the neighboring block as the reference picture of the current block, and obtain the motion vector of the current block by scaling the motion vector of the neighboring block according to a ratio of a picture order count (POC) distance between a current picture and the reference picture of the neighboring block to a POC distance between the current picture and the reference picture of the current block.

The one or more processors may be further configured to: based on the identified number of pictures being 2, and the change information indicating a second type change, select the reference picture of the neighboring block as the reference picture of the current block, and obtain the motion vector of the current block by applying the offset to at least one of the x-component or the y-component of the motion vector of the neighboring block.

The one or more processors may be further configured to: based on the identified number of pictures being 3 or more, select the picture different from the reference picture of the neighboring block as the reference picture of the current block, and obtain the motion vector of the current block by scaling the motion vector of the neighboring block according to a ratio of a picture order count (POC) distance between a current picture and the reference picture of the neighboring block to a POC distance between the current picture and the reference picture of the current block.

According to another embodiment of the disclosure, a method of encoding motion information by an encoding apparatus, may include: determining whether to change motion information of a neighboring block temporally or spatially related to a current block; and generating a bitstream including first information indicating the neighboring block, second information indicating whether to change the motion information, and third information indicating a differential motion vector, wherein when a higher block including the current block is able to use one reference picture list, and a reference picture of the neighboring block is selected as a reference picture of the current block, the differential motion vector corresponds to a difference between a motion vector of the current block and a result obtained by applying an offset to at least one of an x-component or a y-component of a motion vector of the neighboring block.

BRIEF DESCRIPTION OF THE DRAWINGS

The above and/or other aspects will be more apparent by describing certain example embodiments, with reference to the accompanying drawings, in which:

FIG. 10 illustrates that a shape into which a non-square second coding unit is splittable is restricted when the second coding unit, which is determined by splitting a first coding unit, satisfies a certain condition, according to an embodiment;

FIG. 11 illustrates a process of splitting a square coding unit when split shape mode information indicates that the square coding unit is not to be split into four square coding units, according to an embodiment;

FIG. 13 illustrates a process of determining a depth of a coding unit when a shape and size of the coding unit change, when the coding unit is recursively split such that a plurality of coding units are determined, according to an embodiment;

FIG. 14 illustrates depths that are determinable based on shapes and sizes of coding units, and part indexes (PIDs) that are for distinguishing the coding units, according to an embodiment;

FIG. 17 illustrates various shapes of a coding unit that may be determined based on split shape mode information represented in a binary code, according to an embodiment;

FIG. 18 illustrates other shapes of a coding unit that may be determined based on split shape mode information represented in a binary code, according to an embodiment;

FIG. 19 is a block diagram of an image encoding and decoding system performing loop filtering;

FIG. 22 is an exemplary table showing in which direction a prediction direction of a neighboring block is changed according to a value indicated by change information;

FIG. 23 is an exemplary table showing pictures included in a reference picture list 0 and a reference picture list 1;

FIG. 27 is an exemplary table showing variation distances corresponding to values of variation distance information;

FIG. 28 is an exemplary table showing variation directions corresponding to values of variation direction information;

FIG. 29 is a table for describing a method of selecting a reference picture of a current block according to the number of pictures included in a reference picture list and a value indicated by change information;

DETAILED DESCRIPTION

Figure 1:
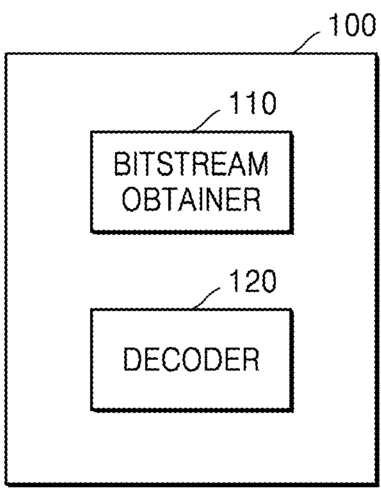
FIG. 1 is a block diagram of an image decoding apparatus according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope are encompassed in the disclosure.

In the description of embodiments, certain detailed explanations of related art are omitted when it is deemed that they may unnecessarily obscure the essence. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' or a 'signal' denotes data assigned to a sampling position of an image, i.e., data to be processed. For example, pixel values of an image in a spatial domain and transform coefficients on a transform region may be samples. A unit including at least one such sample may be defined as a block.

Hereinafter, an image encoding method and apparatus, and an image decoding method and apparatus based on coding units and transform units of a tree structure, according to an embodiment will be described with reference to FIGS. 1 through 19.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions to be performed by the at least one processor.

The bitstream obtainer 110 may receive a bitstream. The bitstream includes information of an image encoded by an image encoding apparatus 200 described later. Also, the bitstream may be transmitted from the image encoding apparatus 200. The image encoding apparatus 200 and the image decoding apparatus 100 may be connected via wires or wirelessly, and the bitstream obtainer 110 may receive the bitstream via wires or wirelessly. The bitstream obtainer 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Regarding detailed operations of the image decoding apparatus 100, the bitstream obtainer 110 may receive the bitstream.

The image decoding apparatus 100 may perform an operation of obtaining, from the bitstream, a bin string corresponding to a split shape mode of a coding unit. Then, the image decoding apparatus 100 may perform an operation of determining a split rule of the coding unit. Also, the image decoding apparatus 100 may perform an operation of splitting the coding unit into a plurality of coding units, based on at least one of the bin string corresponding to the split shape mode or the split rule. The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). According to an embodiment, one slice may include one or more tiles or one or more largest coding units. A slice including one or more tiles may be determined in a picture.

There is a largest coding block (coding tree block (CTB)) conceptually compared to a largest coding unit (CTU). The largest coding unit (CTB) denotes an N×N block including N×N samples (N is an integer). Each color component may be split into one or more largest coding blocks.

When a picture includes three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, or split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
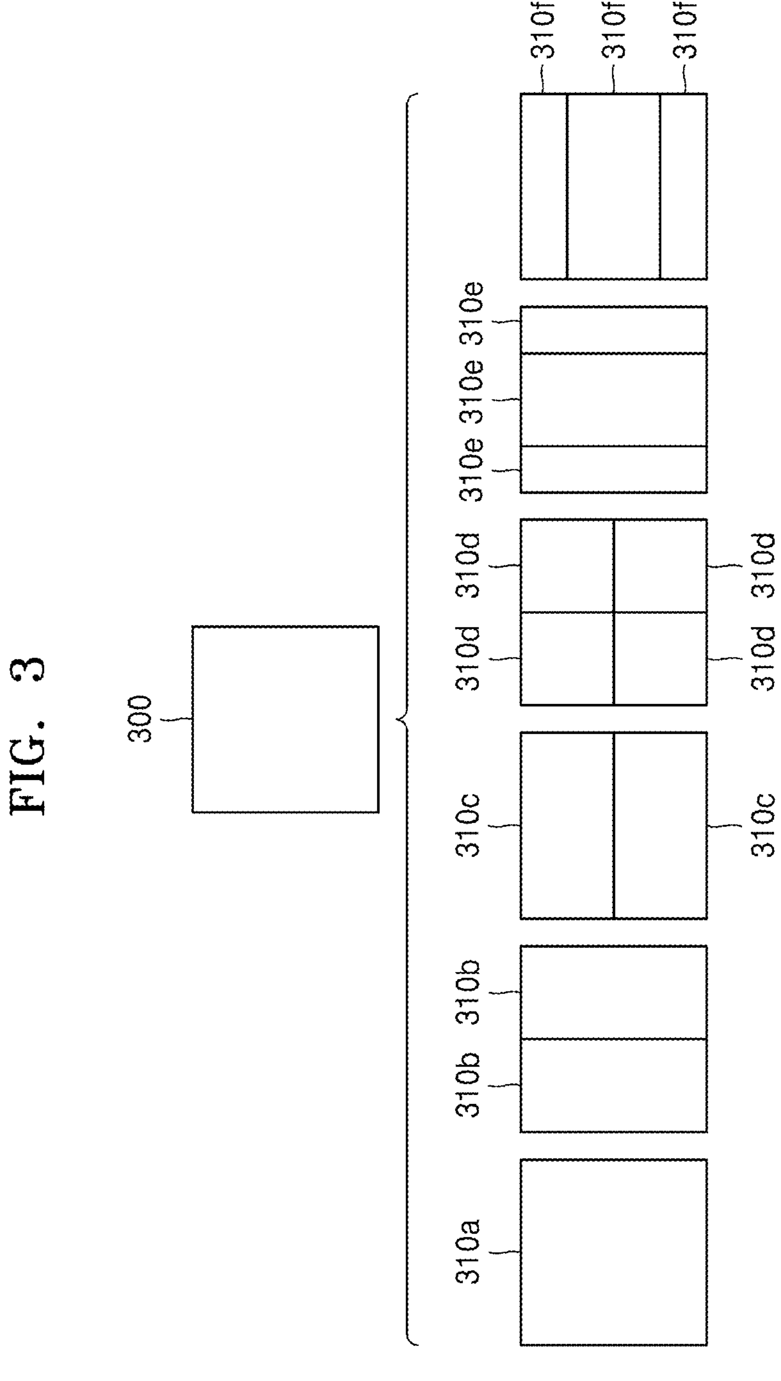
FIG. 3 illustrates a process of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310*a* having the same size as the current coding unit 300 is not split, based on the split shape mode information indicating not to perform splitting, or may determine coding units 310*b*, 310*c*, 310*d*, 310*e*, or 310*f* split based on the split shape mode information indicating a certain splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*e* obtained by splitting the current coding unit 300 in a vertical direction, based on the split shape mode information indicating to perform ternary-splitting in a vertical direction. The image decoding apparatus 100 may determine three coding units 310*f* obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

Figure 4:
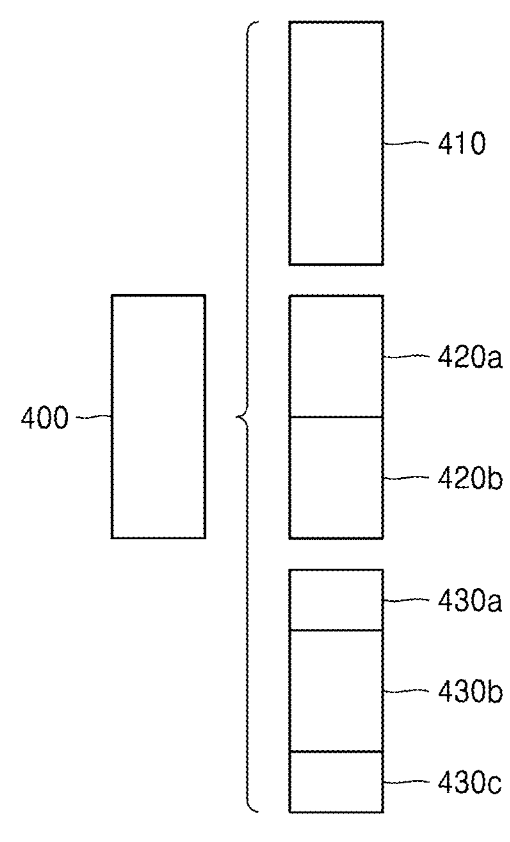
FIG. 4 illustrates a process of determining at least one coding unit by splitting a non-square coding unit, according to an embodiment.
Figure 4:
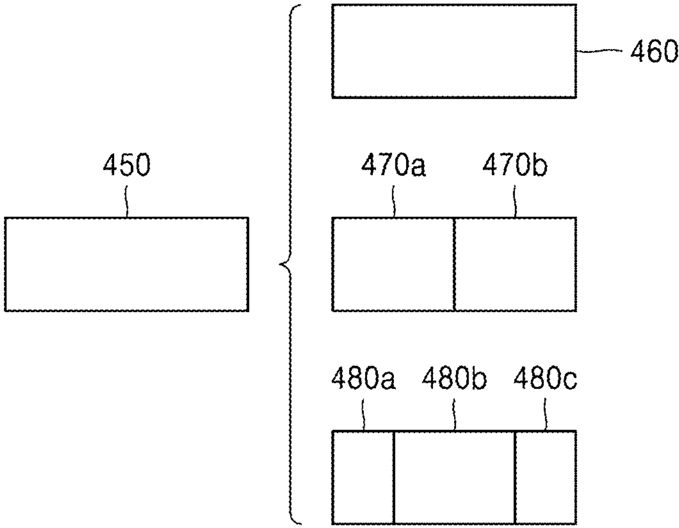

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420*a* and 420*b*, 430*a* to 430*c*, 470*a* and 470*b*, or 480*a* to 480*c* split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. Also, when the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c* or 480*a*, 480*b*, and 480*c* generated as the current coding unit 400 or 450 is split to be different from that of the other coding units 430*a* and 430*c*, or 480*a* or 480*c*. For example, the image decoding apparatus 100 may restrict the coding unit 430*b* or 480*b* at the center location to be no longer split or to be split only a certain number of times, unlike the other coding units 430*a* and 430*c*, or 480*a* and 480*c*.

Figure 5:
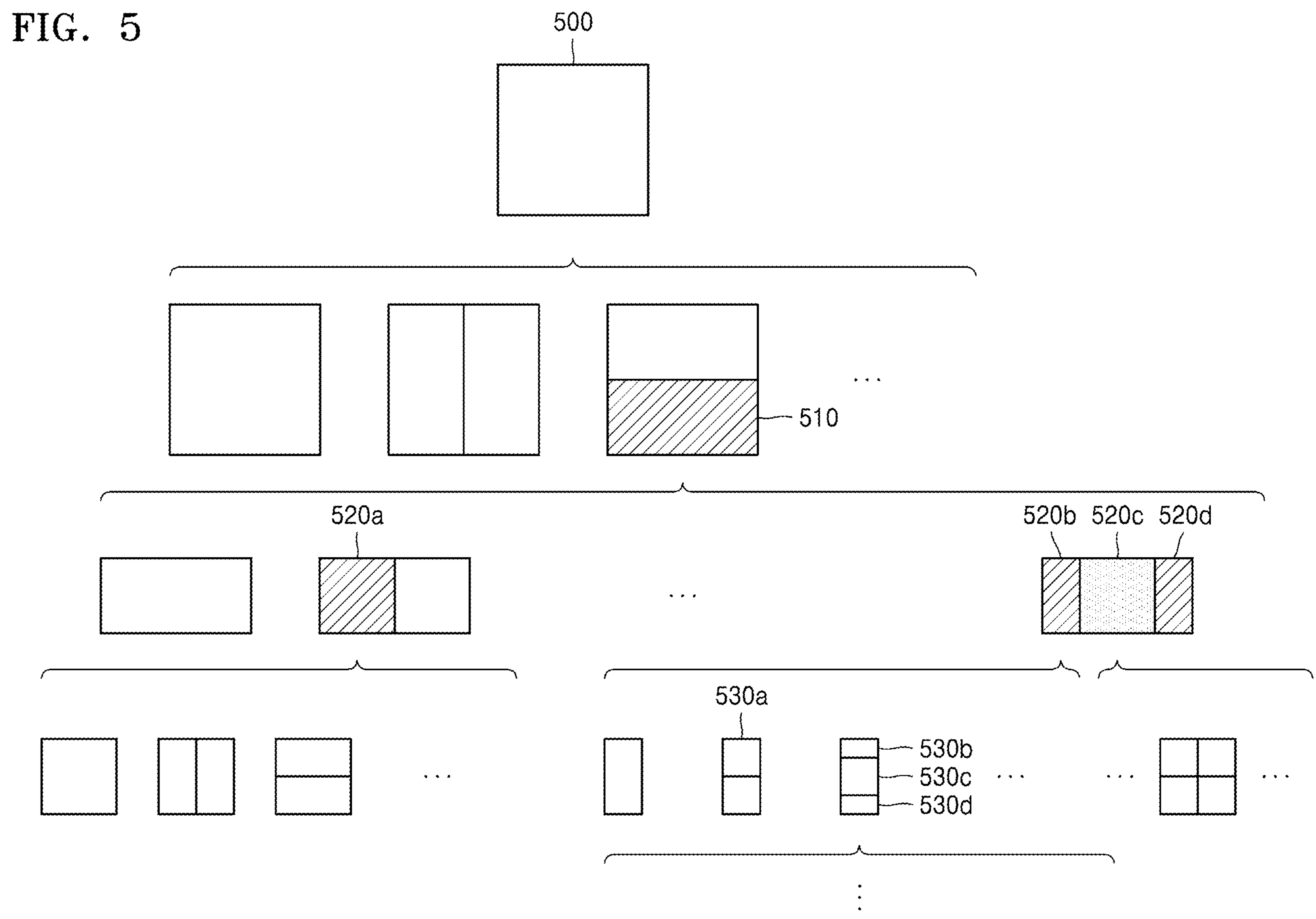
FIG. 5 illustrates a process of splitting a coding unit based on at least one of block shape information or split shape mode information, according to an embodiment.

FIG. 5 illustrates a process, performed by the image decoding apparatus 100, of splitting a coding unit based on at least one of block shape information or split shape mode information, according to an embodiment.

According to an embodiment, the image decoding apparatus 100 may determine to split or not to split a square first coding unit 500 into coding units, based on at least one of the block shape information or the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, or 520*b*, 520*c*, and 520*d* based on the split shape mode information, or may not split the non-square second coding unit 510. The image decoding apparatus 100 may obtain the split shape mode information, and may obtain a plurality of various-shaped second coding units (e.g., the second coding unit 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit (e.g., a coding unit located at a center location, or a square coding unit) from among the odd number of third coding units 520*b*, 520*c*, and 520*d* determined by splitting the non-square second coding unit 510 may be recursively split. According to an embodiment, the non-square third coding unit 520*b* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units

520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
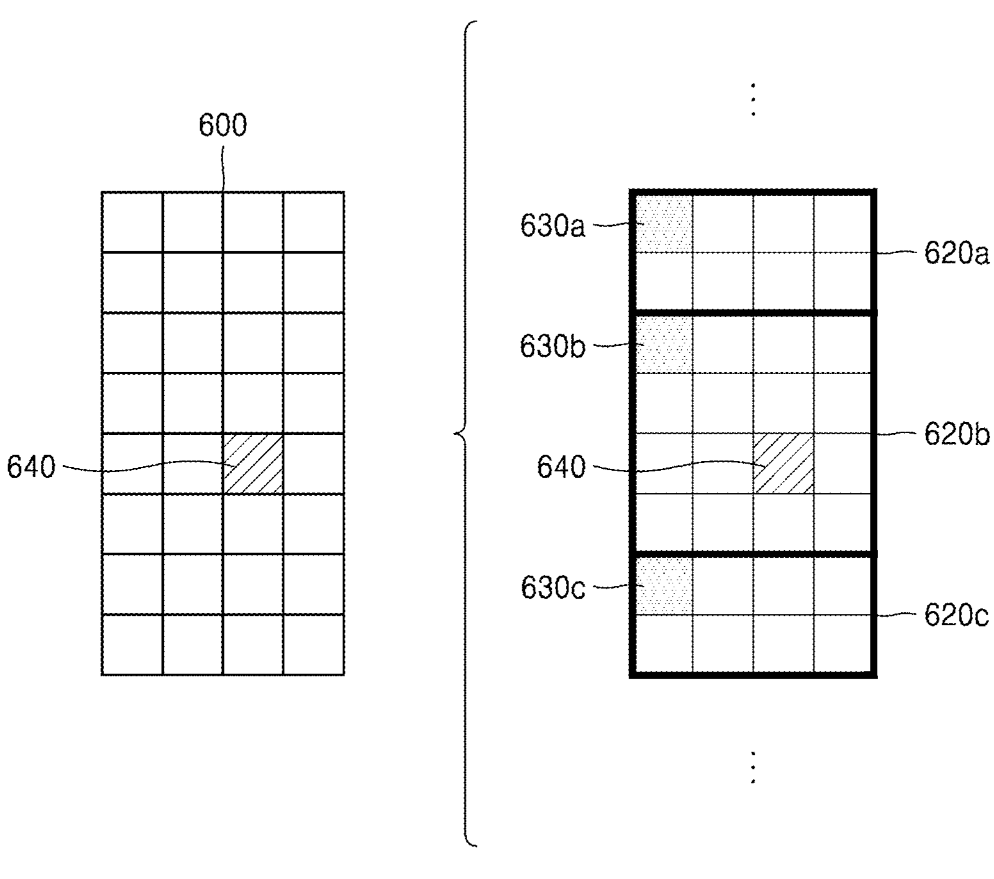
FIG. 6 illustrates a method of determining a certain coding unit from among an odd number of coding units, according to an embodiment.
Figure 6:
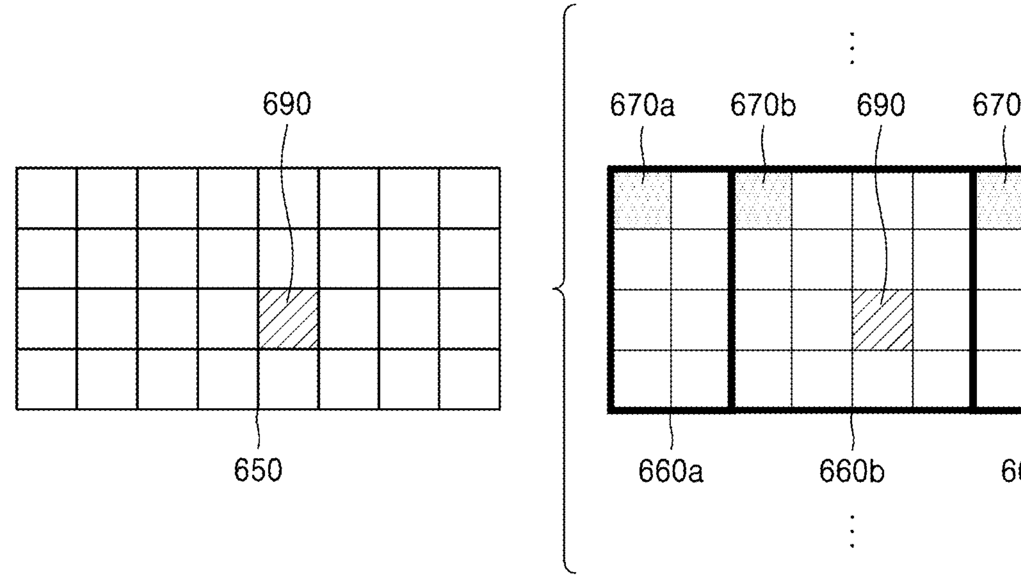

FIG. 6 illustrates a method, performed by the image decoding apparatus 100, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper left samples 630*a*, 630*b*, and 630*c* may include coordinates indicating absolute locations in the picture, or may use coordinates (dxb, dyb) indicating a relative location of the upper left sample 630*b* of the middle coding unit 620*b* and coordinates (dxc, dyc) indicating a relative location of the upper left sample 630*c* of the lower coding unit 620*c* with reference to the location of the upper left sample 630*a* of the upper coding unit 620*a*. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a certain criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper left sample 630*a* of the upper coding unit 620*a*, the coordinates (xb, yb) that is the information indicating the location of the upper left sample 630*b* of the middle coding unit 620_b_, and the coordinates (xc, yc) that is the information indicating the location of the upper left sample 630_c_ of the lower coding unit 620_c_. The image decoding apparatus 100 may determine the respective sizes of the coding units 620_a_, 620_b_, and 620_c_ by using the coordinates (xa, ya), (xb, yb), and (xc, yc) indicating the locations of the coding units 620_a_, 620_b_, and 620_c_. According to an embodiment, the image decoding apparatus 100 may determine the width of the upper coding unit 620_a_ to be the width of the current coding unit 600. The image decoding apparatus 100 may determine the height of the upper coding unit 620_a_ to be yb−ya. According to an embodiment, the image decoding apparatus 100 may determine the width of the middle coding unit 620_b_ to be the width of the current coding unit 600. The image decoding apparatus 100 may determine the height of the middle coding unit 620_b_ to be yc−yb. According to an embodiment, the image decoding apparatus 100 may determine the width or height of the lower coding unit 620_c_ by using the width or height of the current coding unit 600 or the widths or heights of the upper and middle coding units 620_a_ and 620_b_. The image decoding apparatus 100 may determine a coding unit, which has a size different from that of the others, based on the determined widths and heights of the coding units 620_a_ to 620_c_. Referring to FIG. 6, the image decoding apparatus 100 may determine the middle coding unit 620_b_, which has a size different from the size of the upper and lower coding units 620_a_ and 620_c_, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660_a_, 660_b_, and 660_c_ by using the coordinates (xd, yd) that is information indicating the location of a upper left sample 670_a_ of the left coding unit 660_a_, the coordinates (xe, ye) that is information indicating the location of a upper left sample 670_b_ of the middle coding unit 660_b_, and the coordinates (xf, yf) that is information indicating a location of the upper left sample 670_c_ of the right coding unit 660_c_. The image decoding apparatus 100 may determine the respective sizes of the coding units 660_a_, 660_b_, and 660_c_ by using the coordinates (xd, yd), (xe, ye), and (xf, yf) indicating the locations of the coding units 660_a_, 660_b_, and 660_c_.

According to an embodiment, the image decoding apparatus 100 may determine the width of the left coding unit 660_a_ to be xe−xd. The image decoding apparatus 100 may determine the height of the left coding unit 660_a_ to be the height of the current coding unit 650. According to an embodiment, the image decoding apparatus 100 may determine the width of the middle coding unit 660_b_ to be xf−xe. The image decoding apparatus 100 may determine the height of the middle coding unit 660_b_ to be the height of the current coding unit 650. According to an embodiment, the image decoding apparatus 100 may determine the width or height of the right coding unit 660_c_ by using the width or height of the current coding unit 650 or the widths or heights of the left and middle coding units 660_a_ and 660_b_. The image decoding apparatus 100 may determine a coding unit, which has a size different from that of the others, based on the determined widths and heights of the coding units 660_a_ to 660_c_. Referring to FIG. 6, the image decoding apparatus 100 may determine the middle coding unit 660_b_, which has a size different from the sizes of the left and right coding units 660_a_ and 660_c_, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information or split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620_a_, 620_b_, and 620_c_ based on the split shape mode information, and may determine the coding unit 620_b_ at a center location from among the plurality of the coding units 620_a_, 620_b_, and 620_c_. Furthermore, the image decoding apparatus 100 may determine the coding unit 620_b_ at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620_a_, 620_b_, and 620_c_ based on the split shape mode information, the coding unit 620_b_ including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620_a_, 620_b_, and 620_c_ determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620_b_ including a sample, from which certain information (e.g., the split shape mode information) may be obtained, from among the plurality of coding units 620_a_, 620_b_, and 620_c_ determined by splitting the current coding unit 600, and may put a certain restriction on the coding unit 620_b_. Referring to FIG. 6, according to an embodiment, the image decoding apparatus 100 may determine the sample 640 at the center location of the current coding unit 600 as the sample from which the certain information may be obtained, and may put a certain restriction on the coding unit 620_b_ including the sample 640, in a decoding operation. However, the location of the sample from which the certain information may be obtained is not limited to the above-described location, and may include arbitrary locations of samples included in the coding unit 620_b_ to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width or height of the current coding unit in half, as the sample from which the certain information may be obtained, by using at least one of information about the width of the current coding unit or information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the certain information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
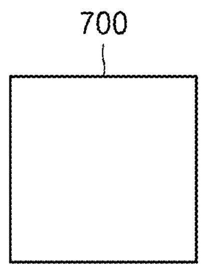
FIG. 7 illustrates an order of processing a plurality of coding units when the plurality of coding units are determined by splitting a current coding unit, according to an embodiment.
Figure 7:
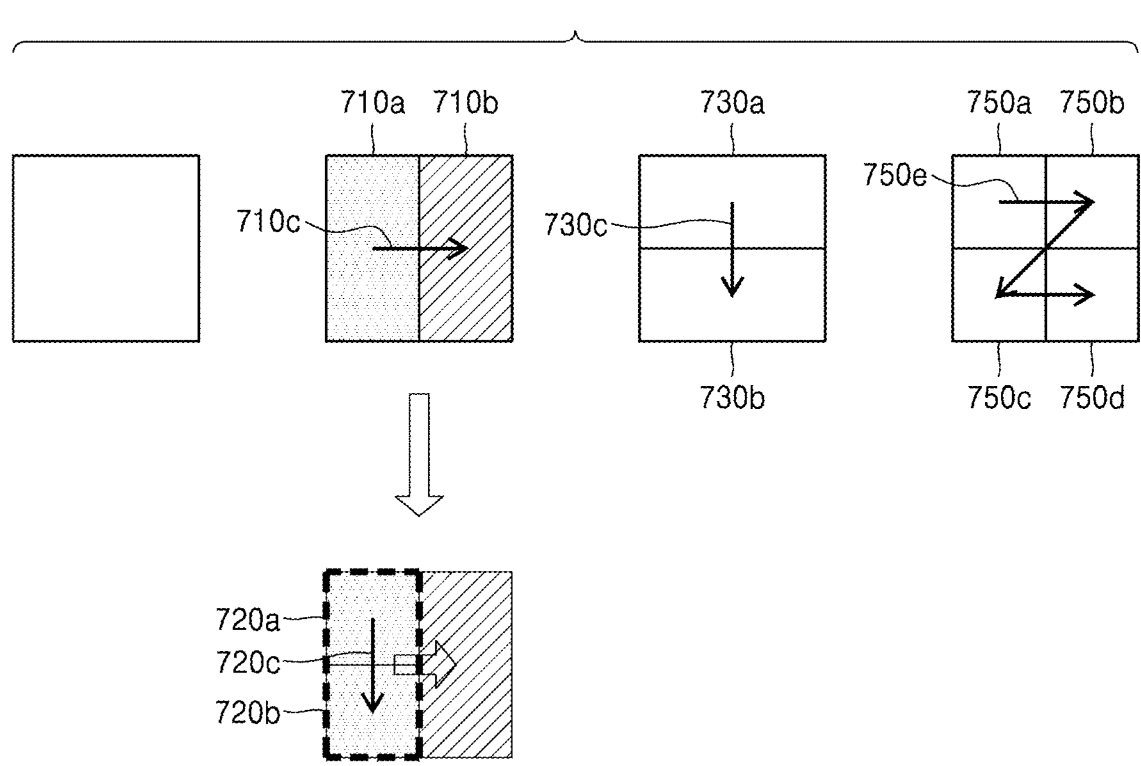

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710_a_ and 710_b_ by splitting a first coding unit 700 in a vertical direction, determine second coding units 730_a_ and 730_b_ by splitting the first coding unit 700 in a horizontal direction, or determine second coding units 750_a_ to 750_d_ by splitting the first coding unit 700 in vertical and horizontal directions, based on split shape mode information.

Referring to FIG. 7, the image decoding apparatus 100 may determine to process the second coding units 710_a_ and 710_b_, which are determined by splitting the first coding unit 700 in a vertical direction, in a horizontal direction order 710_c_. The image decoding apparatus 100 may determine to process the second coding units 730_a_ and 730_b_, which are determined by splitting the first coding unit 700 in a horizontal direction, in a vertical direction order 730_c_. The image decoding apparatus 100 may determine to process the second coding units 750_a_ to 750_d_, which are determined by splitting the first coding unit 700 in vertical and horizontal directions, according to a certain order (e.g., in a raster scan order or Z-scan order 750_e_) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710_a_ and 710_b_, 730_a_ and 730_b_, or 750_a_ to 750_d_ by splitting the first coding unit 700, and recursively split each of the determined plurality of coding units 710_b_, 730_a_ and 730_b_, or 750_a_ to 750_d_. A splitting method of the plurality of coding units 710_b_, 730_a_ and 730_b_, or 750_a_ to 750_d_ may correspond to a splitting method of the first coding unit 700. As such, each of the plurality of coding units 710_b_, 730_a_ and 730_b_, or 750_a_ to 750_d_ may be independently split into a plurality of coding units. Referring to FIG. 7, the image decoding apparatus 100 may determine the second coding units 710_a_ and 710_b_ by splitting the first coding unit 700 in a vertical direction, and may determine to independently split or not to split each of the second coding units 710_a_ and 710_b_.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a certain order.

Figure 8:
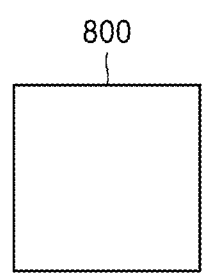
FIG. 8 illustrates a process of determining that a current coding unit is to be split into an odd number of coding units, when the coding units are not processable in a certain order, according to an embodiment.
Figure 8:
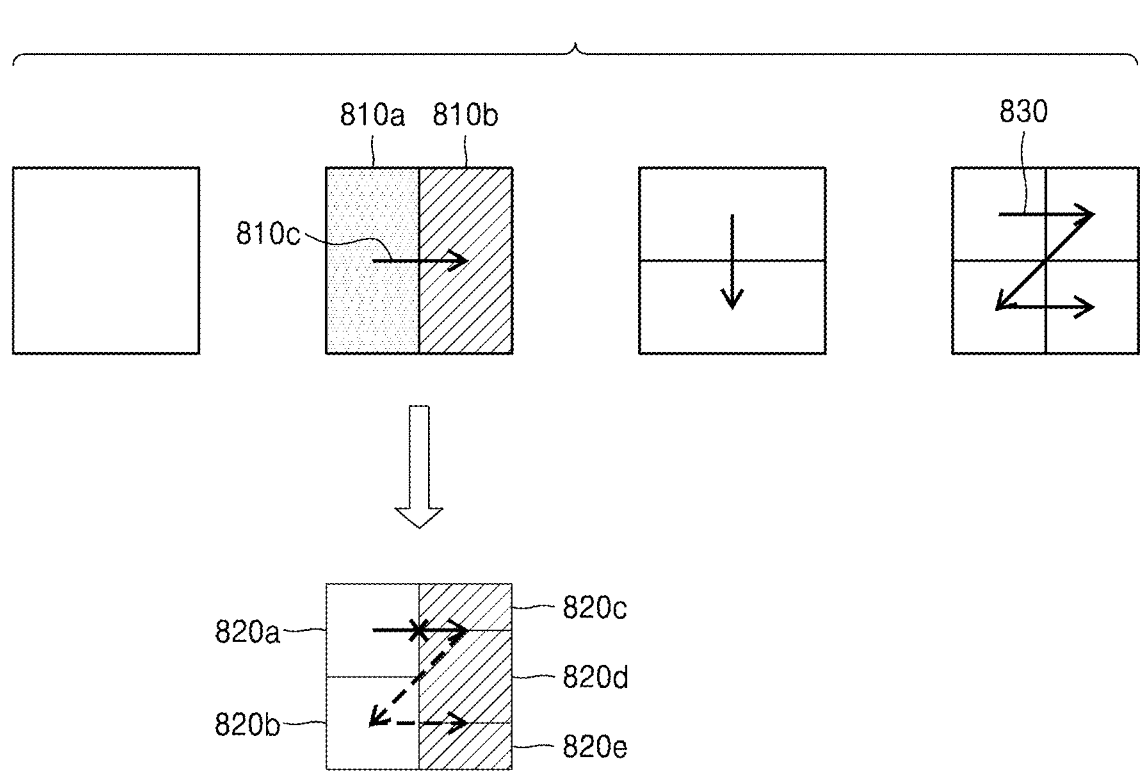

FIG. 8 illustrates a process, performed by the image decoding apparatus 100, of determining that a current coding unit is to be split into an odd number of coding units, when the coding units are not processable in a certain order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810*a* and 810*b*. The non-square second coding units 810*a* and 810*b* may be processed in a horizontal direction order 810*c*. The second coding units 810*a* and 810*b* may be independently split into third coding units 820*a* and 820*b*, and 820*c* to 820*e*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c* to 820*e*.

According to an embodiment, the image decoding apparatus 100 may determine whether any coding unit is split into an odd number of coding units, by determining whether the third coding units 820*a* and 820*b*, and 820*c* to 820*e* are processable in a certain order. Referring to FIG. 8, the image decoding apparatus 100 may determine the third coding units 820*a* and 820*b*, and 820*c* to 820*e* by recursively splitting the first coding unit 800. The image decoding apparatus 100 may determine whether any of the first coding unit 800, the second coding units 810*a* and 810*b*, or the third coding units 820*a* and 820*b*, and 820*c* to 820*e* are split into an odd number of coding units, based on at least one of the block shape information or the split shape mode information. For example, a second coding unit located in the right from among the second coding units 810*a* and 810*b* may be split into an odd number of third coding units 820*c*, 820*d*, and 820*e*. A processing order of a plurality of coding units included in the first coding unit 800 may be a certain order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the certain order.

According to an embodiment, the image decoding apparatus 100 may determine whether the third coding units 820*a* and 820*b*, and 820*c* to 820*e* included in the first coding unit 800 satisfy the condition for processing in the certain order, and the condition relates to whether at least one of a width or height of the second coding units 810*a* and 810*b* is to be split in half along a boundary of the third coding units 820*a* and 820*b*, and 820*c* to 820*e*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

Figure 9:
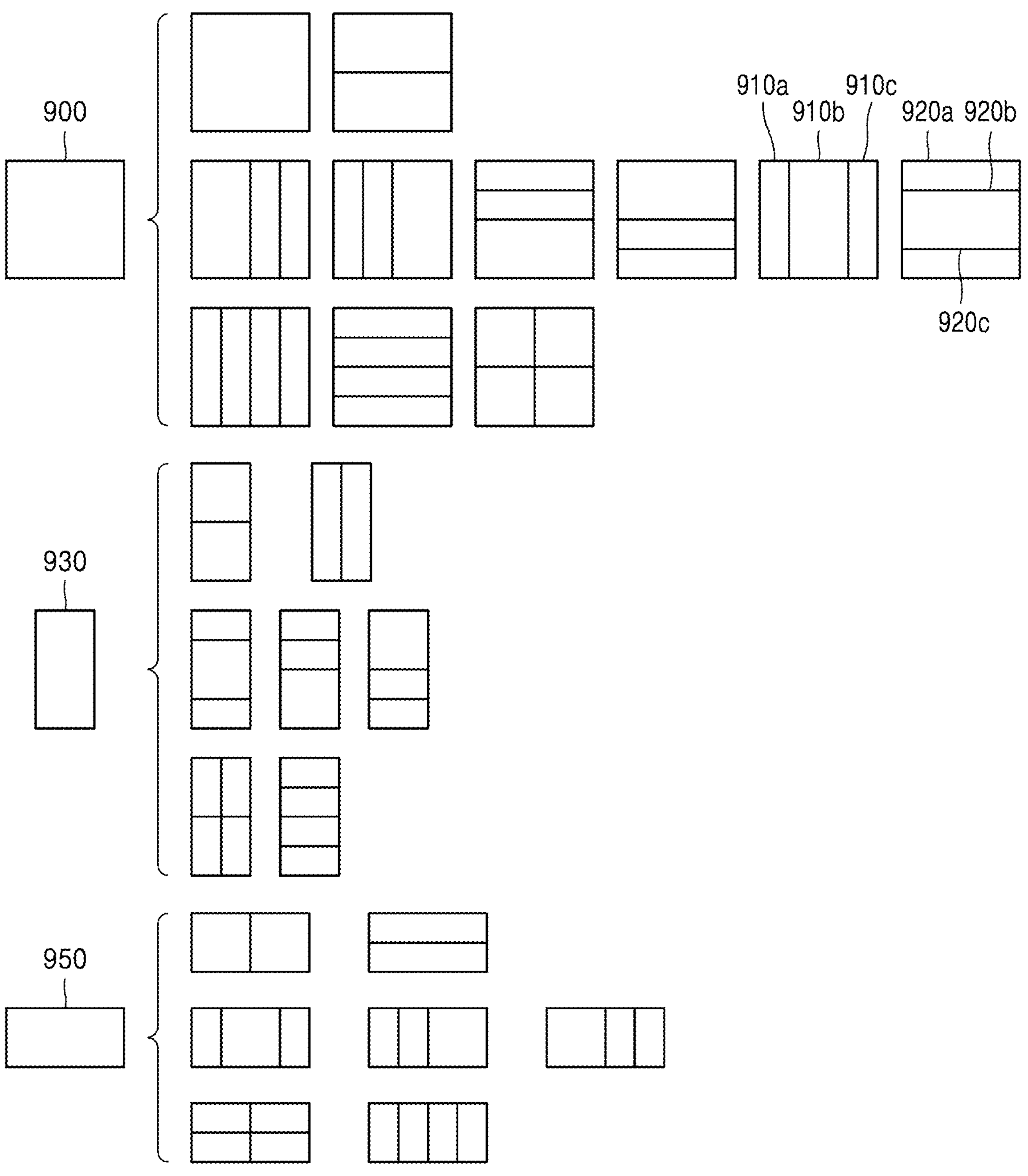
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bitstream obtainer 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a certain order, and the condition relates to whether at least one of a width or height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof are not provided again.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
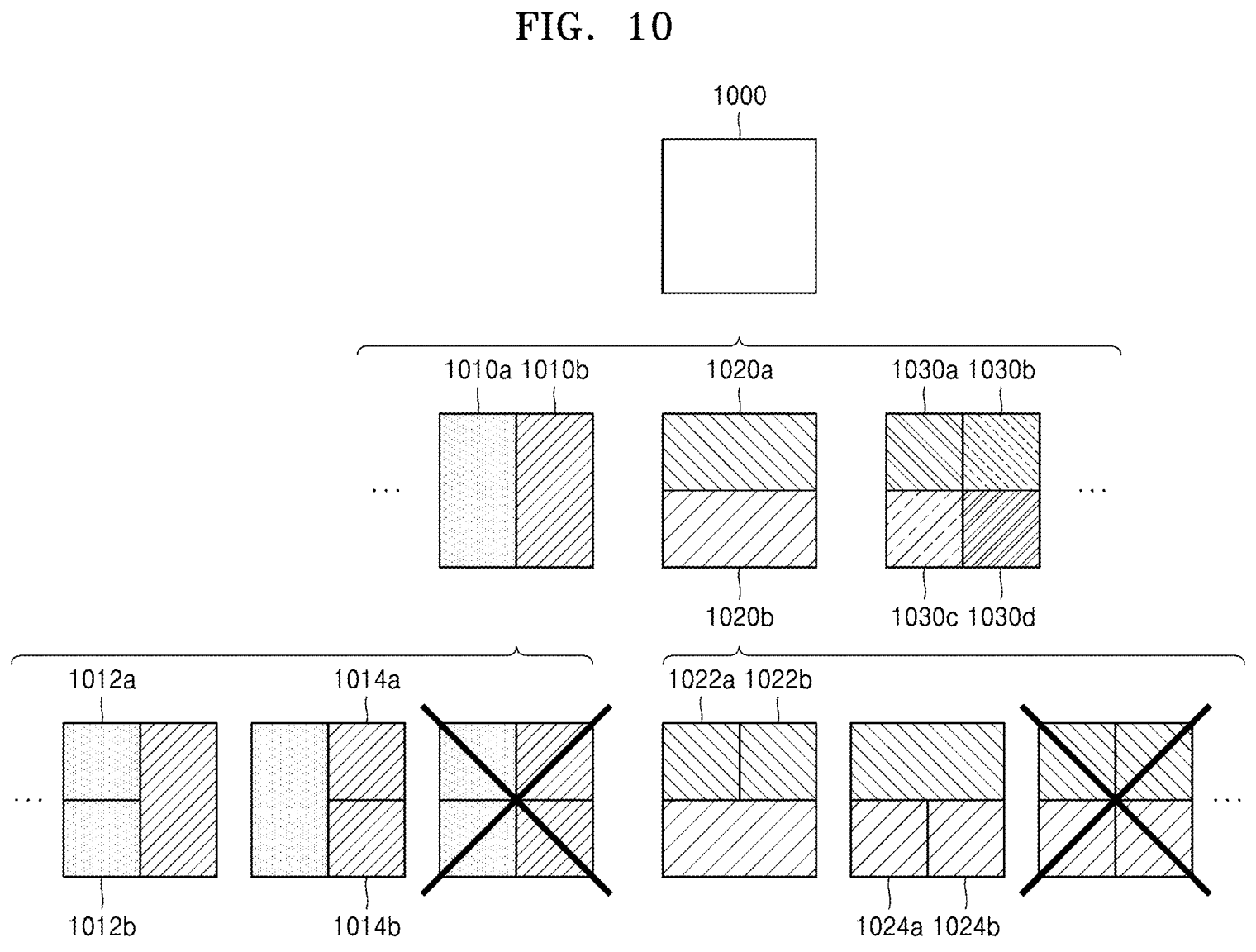

FIG. 10 illustrates that a shape into which a second coding unit is splittable is restricted when the second coding unit having a non-square shape, which is determined as the image decoding apparatus 100 splits a first coding unit 1000, satisfies a certain condition, according to an embodiment.

According to an embodiment, the image decoding apparatus 100 may determine to split the square first coding unit 1000 into non-square second coding units 1010*a*, and 1010*b* or 1020*a* and 1020*b*, based on split shape mode information, which is obtained by the bitstream obtainer 110. The second coding units 1010*a* and 1010*b* or 1020*a* and 1020*b* may be independently split. As such, the image decoding apparatus 100 may determine to split or not to split each of the second coding units 1010*a* and 1010*b* or 1020*a* and 1020*b* into a plurality of coding units, based on the split shape mode information of each of the second coding units 1010*a* and 1010*b* or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b* or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding apparatus 100 may determine third coding units 1022*a* and 1022*b* or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) to not be split in a vertical direction in which the upper second coding unit 1020*a* is split.

Figure 11:
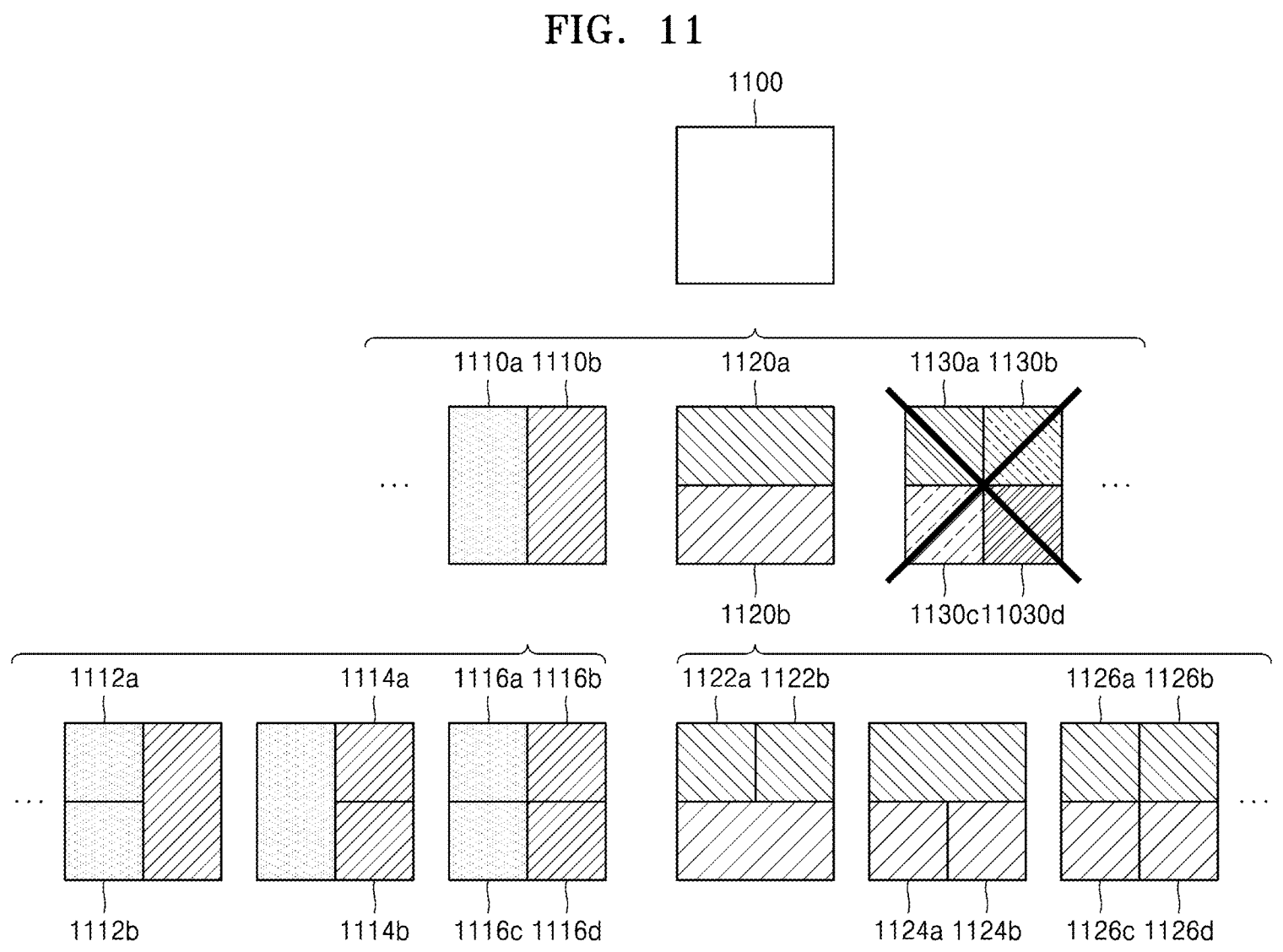

FIG. 11 illustrates a process, performed by the image decoding apparatus 100, of splitting a square coding unit when split shape mode information is unable to indicate that the square coding unit is split into four square coding units, according to an embodiment.

According to an embodiment, the image decoding apparatus 100 may determine second coding units 1110*a* and 1110*b* or 1120*a* and 1120*b*, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b* or 1120*a* and 1120*b*, etc., based on the split shape mode information.

According to an embodiment, the image decoding apparatus 100 may independently split the non-square second coding units 1110*a* and 1110*b* or 1120*a* and 1120*b*, etc. Each of the second coding units 1110*a* and 1110*b* or 1120*a* and 1120*b*, etc. may be recursively split in a certain order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both of the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
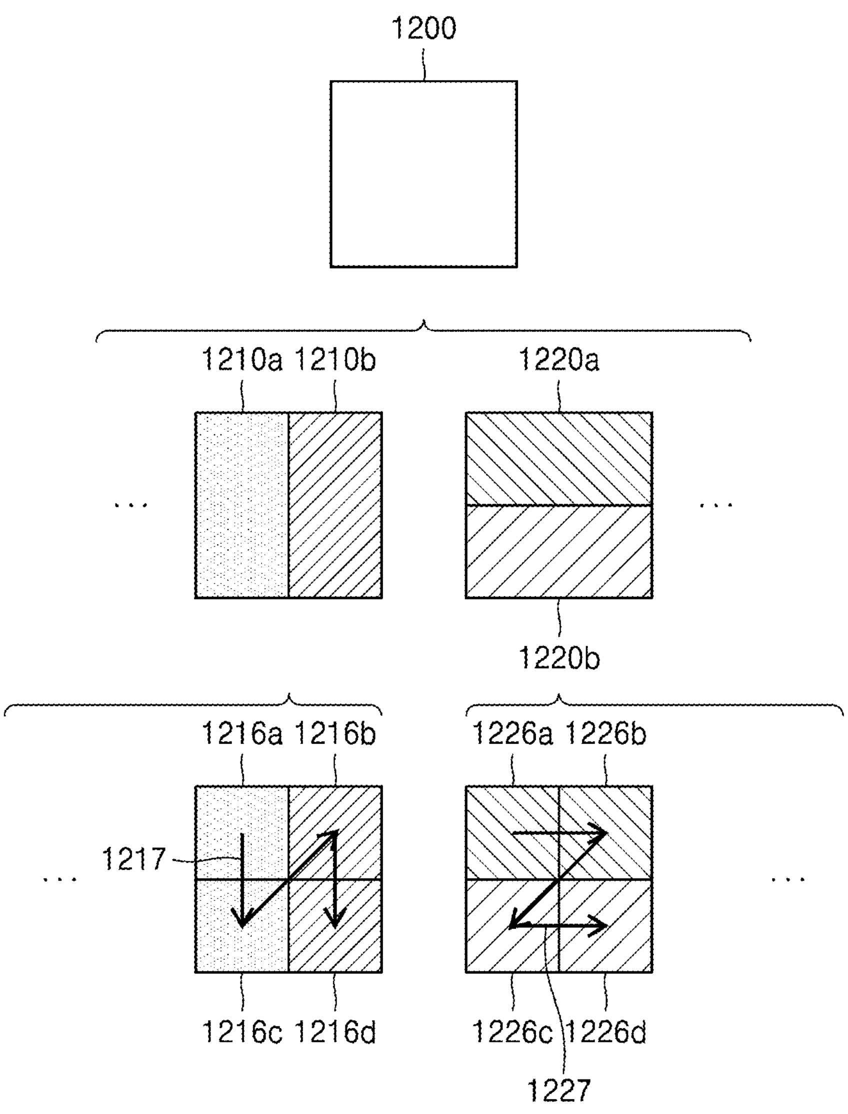
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of a horizontal direction or a vertical direction, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b* or 1220*a* and 1220*b* has been described above in relation to FIG. 11, and thus detailed descriptions thereof will not be provided herein.

According to an embodiment, the image decoding apparatus 100 may process coding units in a certain order. An operation of processing coding units in a certain order has been described above in relation to FIG. 7, and thus detailed descriptions thereof are not provided again. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is $2n$ times ($n>0$) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width or height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width or height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width or height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width or height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width or height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of a vertical direction and a horizontal direction based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, a depth of the second coding units 1402*a* and 1402*b*, 1404*a* and 1404*b*, and 1406*a*, 1406*b*, 1406*c*, and 1406*d*, which are determined based on the split shape mode information of the square first coding unit 1400, may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 2100 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, depths of the second coding units 1412*a* and 1412*b*, and 1414*a*, 1414*b*, and 1414*c*, or 1422*a* and 1422*b*, and 1424*a*, 1424*b*, and 1424*c* that are determined based on the split shape mode information of the non-square first coding unit 1410 or 1420 may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
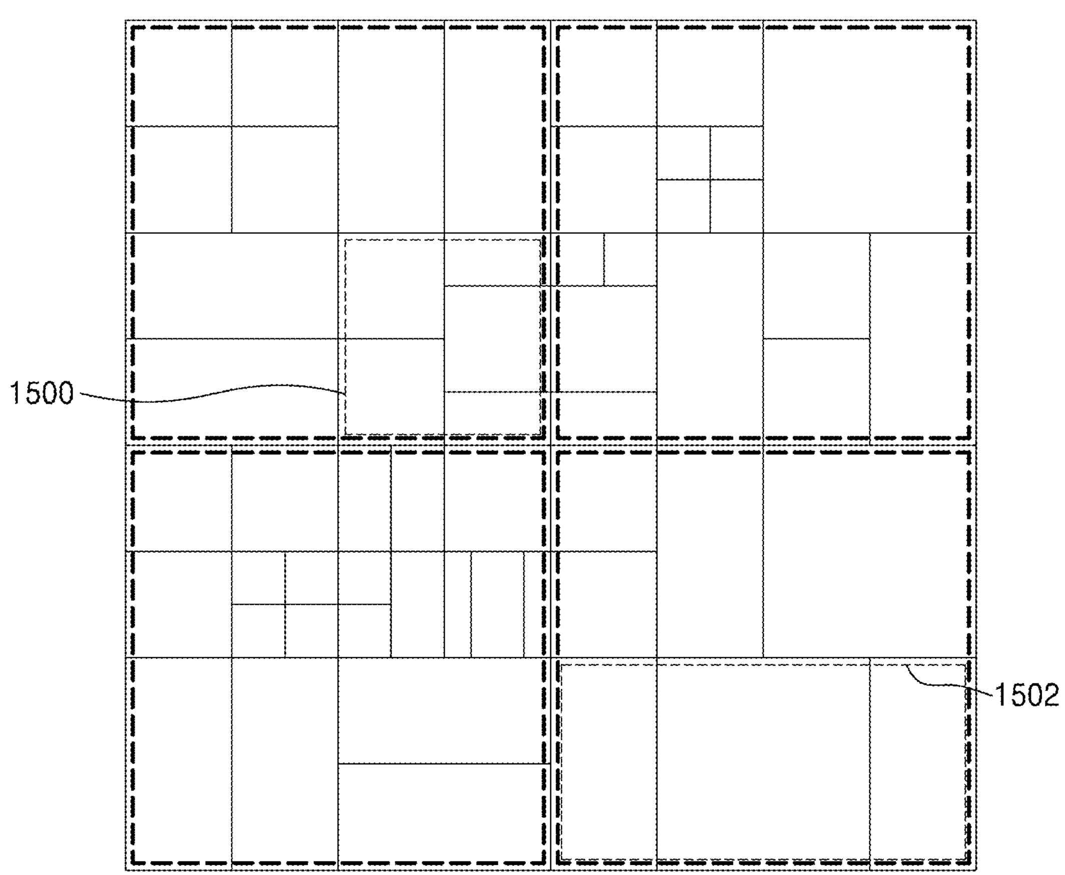
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information or reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof are not provided again.

According to an embodiment, the image decoding apparatus 100 may use a PID for identifying the size and shape of reference coding units, to determine the size and shape of reference coding units according to some data units previously determined based on a certain condition. That is, the bitstream obtainer 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size or shape of reference coding units corresponding to the PID for identifying the size and shape of reference coding units may be previously determined. That is, the image decoding apparatus 100 may determine at least one of the size or shape of reference coding units included in a data unit serving as a unit for obtaining the PID, by selecting the previously determined at least one of the size or shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width or height of the largest coding unit may be integer times at least one of the width or height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit or each reference coding unit, and may use the obtained syntax element.

Hereinafter, a method of determining a split rule, according to an embodiment of the disclosure will be described in detail.

The image decoding apparatus 100 may determine a split rule of an image. The split rule may be pre-determined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may pre-determine to determine the split rule based on the block shape information of the coding unit. However, an embodiment is not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, or 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Figure 16:
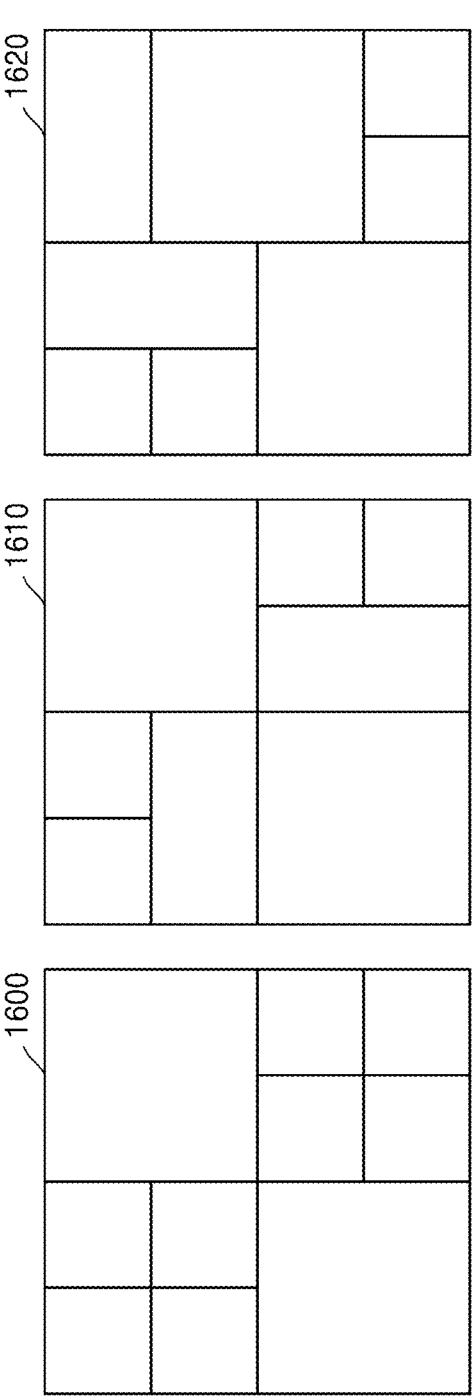
FIG. 16 illustrates coding units that may be determined for each picture when a combination of shapes into which a coding unit is splittable is different for each picture, according to an embodiment.

FIG. 16 illustrates coding units that may be determined for each picture when a combination of shapes into which a coding unit is splittable is different for each picture, according to an embodiment.

Referring to FIG. 16, the image decoding apparatus 100 may determine a combination of split shapes into which a coding unit is splittable to be different for each picture. For example, the image decoding apparatus 100 may decode an image by using a picture 1600 splittable into 4 coding units, a picture 1610 splittable into 2 or 4 coding units, and a picture 1620 splittable into 2, 3, or 4 coding units, among at least one picture included in the image. The image decoding apparatus 100 may only use split shape information indicating a split into 4 square coding units so as to split the picture 1600 into a plurality of coding units. The image decoding apparatus 100 may only use split shape information indicating a split into 2 or 4 coding units so as to split the picture 1610. The image decoding apparatus 100 may only use split shape information indicating a split into 2, 3, or 4 coding units so as to split the picture 1620. Because the above combinations of split shapes are only embodiments for describing operations of the image decoding apparatus 100, the combinations of split shapes should not be interpreted limitedly to the embodiments and it should be interpreted that various types of combinations of split shapes may be used for each of certain data units.

According to an embodiment, the bitstream obtainer 110 of the image decoding apparatus 100 may obtain a bitstream including an index indicating a combination of split shape information for each of certain data units (for example, a sequence, a picture, a slice, a slice segment, a tile, or a tile group). For example, the bitstream obtainer 110 may obtain an index indicating a combination of split shape information from a sequence parameter set, a picture parameter set, a slice header, a tile header, or a tile group header. The bitstream obtainer 110 of the image decoding apparatus 100 may determine a combination of split shapes of coding units into which a certain data unit is splittable by using the obtained index, and accordingly, different combinations of split shapes may be used for each of certain data units.

Figure 17:
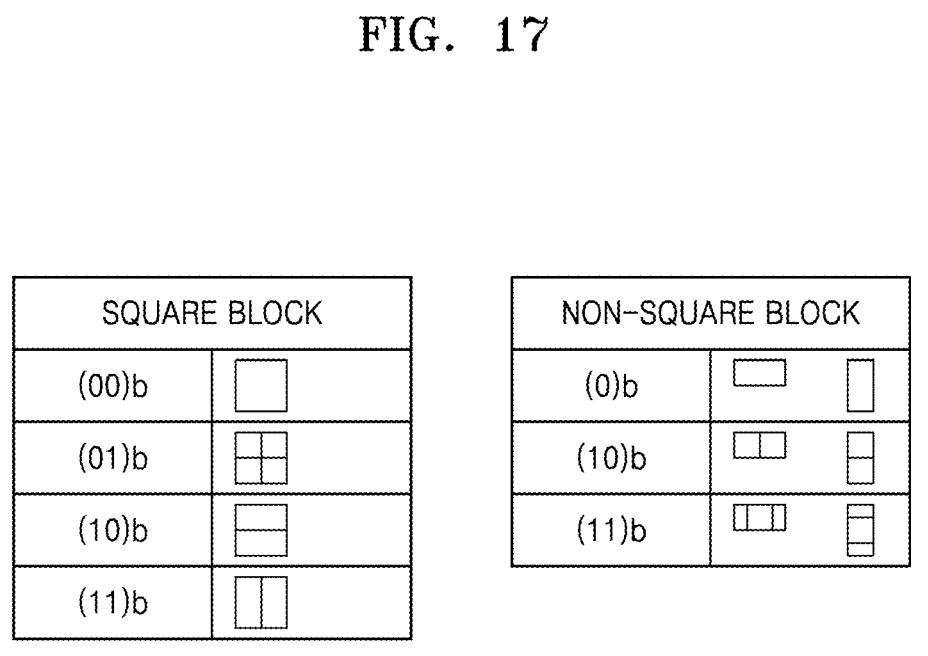

FIG. 17 illustrates various shapes of a coding unit that may be determined based on split shape mode information representable in a binary code, according to an embodiment.

According to an embodiment, the image decoding apparatus 100 may split a coding unit into various shapes by using block shape information and split shape mode information obtained via the bitstream obtainer 110. Splittable shapes of a coding unit may correspond to various shapes including shapes described through above embodiments.

Referring to FIG. 17, the image decoding apparatus 100 may split a square coding unit in at least one of a horizontal direction or a vertical direction, based on split shape mode information, and split a non-square coding unit in a horizontal direction or a vertical direction.

According to an embodiment, when the image decoding apparatus 100 is capable of splitting a square coding unit in a horizontal direction and a vertical direction to obtain 4 square coding units, 4 split shapes may be indicated by split shape mode information for the square coding unit. According to an embodiment, the split shape mode information may be represented as a 2-digit binary code and a binary code may be assigned for each split shape. For example, when a coding unit is not split, split shape mode information may be represented as (00)b, when a coding unit is split in a horizontal direction and a vertical direction, split shape mode information may be represented as (01)b, when a coding unit is split in a horizontal direction, split shape mode information may be represented as (10)b, and when a coding unit is split in a vertical direction, split shape mode information may be represented as (11)b.

According to an embodiment of the image decoding apparatus 100, when a non-square coding unit is split in a horizontal direction or a vertical direction, a type of split shape indicated by split shape mode information may be determined based on the split number of coding units. Referring to FIG. 17, the image decoding apparatus 100 may split the non-square coding unit up to 3 coding units, according to an embodiment. The image decoding apparatus 100 may split a coding unit into two coding units and in this case, split shape mode information may be represented as (10)b. The image decoding apparatus 100 may split a coding unit into three coding units and in this case, split shape mode information may be represented as (11)b. The image decoding apparatus 100 may determine not to split a coding unit and in this case, split shape mode information may be represented as (0)b. In other words, the image decoding apparatus 100 may use variable length coding (VLC) instead of fixed length coding (FLC) so as to use a binary code indicating split shape mode information.

According to an embodiment, referring to FIG. 17, a binary code of split shape mode information indicating that a coding unit is not split may be represented as (0)b. When a binary code of split shape mode information indicating that a coding unit is not split is set to (00)b, binary codes of split shape mode information of 2-bit are all used despite that there is no split shape mode information set as (01)b. However, as shown in FIG. 17, when 3 types of split shapes are used for a non-square coding unit, the image decoding apparatus 100 is able to determine that a coding unit is not split even by using one-bit binary code (0)b as split shape mode information, and thus a bitstream may be efficiently used. However, split shapes of a non-square coding unit indicated by split shape mode information should not be interpreted limitedly to 3 shapes described with reference to FIG. 17, and should be interpreted as various shapes including the above-described embodiments.

Figure 18:
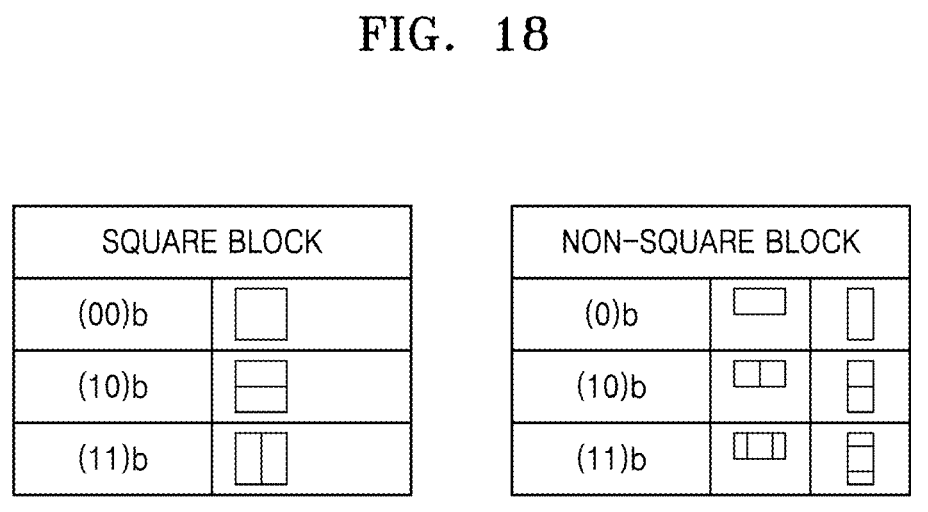

FIG. 18 illustrates other shapes of a coding unit that may be determined based on split shape mode information representable in a binary code, according to an embodiment.

Referring to FIG. 18, the image decoding apparatus 100 may split a square coding unit in a horizontal direction or a vertical direction, based on split shape mode information, and split a non-square coding unit in a horizontal direction or a vertical direction. In other words, split shape mode information may indicate that a square coding unit is split in one direction. In this case, a binary code of split shape mode information indicating that a square coding unit is not split may be represented as (0)b. When a binary code of split shape mode information indicating that a coding unit is not split is set to (00)b, binary codes of split shape mode information of 2-bit are all used despite that there is no split shape mode information set as (01)b. However, as shown in FIG. 18, when 3 types of split shapes are used for a square coding unit, the image decoding apparatus 100 is able to determine that a coding unit is not split even by using one-bit binary code (0)b as split shape mode information, and thus a bitstream may be efficiently used. However, split shapes of a square coding unit indicated by split shape mode information should not be interpreted limitedly to 3 shapes described with reference to FIG. 18, and should be interpreted as various shapes including the above-described embodiments.

According to an embodiment, block shape information or split shape mode information may be represented by using a binary code, and such information may be immediately generated as a bitstream. Alternatively, the block shape information or split shape mode information represented in a binary code may be used as a binary code input during context adaptive binary arithmetic coding (CABAC) without being immediately generated as a bitstream.

According to an embodiment, a process in which the image decoding apparatus 100 obtains syntax regarding block shape information or split shape mode information via CABAC will be described. A bitstream including a binary code of the syntax may be obtained via the bitstream obtainer 110. The image decoding apparatus 100 may detect a syntax element indicating block shape information or split shape mode information by inverse-binarizing a bin string included in the obtained bitstream. According to an embodiment, the image decoding apparatus 100 may obtain a set of binary bin strings corresponding to a syntax element to be decoded and decode each bin by using probability information, and may repeat such operations until a bin string including the decoded bins becomes the same as one of previously obtained bin strings. The image decoding apparatus 100 may determine the syntax element by performing inverse binarization on the bin string.

According to an embodiment, the image decoding apparatus 100 may determine the syntax for the bin string by performing a decoding process of adaptive binary arithmetic coding, and update a probability model for the bins obtained via the bitstream obtainer 110. Referring to FIG. 17, the bitstream obtainer 110 of the image decoding apparatus 100 may obtain the bitstream indicating the binary code indicating the split shape mode information, according to an embodiment. The image decoding apparatus 100 may determine the syntax for the split shape mode information by using the binary code having a size of 1 bit or 2 bits. The image decoding apparatus 100 may update a probability for each bit among the 2-bit binary code so as to determine the syntax for the split shape mode information. In other words, the image decoding apparatus 100 may update a probability of having a value of 0 or 1 when decoding a next bin, based on whether a value of a first bin among the 2-bit binary code is 0 or 1.

According to an embodiment, the image decoding apparatus 100 may update, while determining syntax, a probability for bins used while decoding bins of a bin string for the syntax, and may determine that certain bits of the bin string have the same probability without updating the probability.

Referring to FIG. 17, while determining syntax by using a bin string indicating split shape mode information for a non-square coding unit, the image decoding apparatus 100 may determine the syntax for the split shape mode information by using one bin having a value of 0 when the non-square coding unit is not split. In other words, when block shape information indicates that a current coding unit has a non-square shape, a first bin of a bin string for split shape mode information may be 0 when a non-square coding unit is not split and may be 1 when the non-square coding unit is split into 2 or 3 coding units. Accordingly, a probability in which the first bin of the bin string of the split shape mode information for the non-square coding unit is 0 is ⅓, and a probability in which the first bin of the bin string of the split shape mode information for the non-square coding unit is 1 is ⅔. As described above, because split shape mode information indicating that a non-square coding unit is not split is represents only a 1-bit bin string having a value of 0, the image decoding apparatus 100 may determine syntax for the split shape mode information by determining whether a second bin is 0 only when a first bin of the split shape mode information is 1. According to an embodiment, when the first bin of the split shape mode information is 1, the image decoding apparatus 100 may decode bins considering that probabilities of the second bin being 0 and 1 are the same.

According to an embodiment, the image decoding apparatus 100 may use various probabilities for each bin while determining the bins of the bin string for the split shape mode information. According to an embodiment, the image decoding apparatus 100 may differently determine the probabilities of the bins for the split shape mode information, based on a direction of a non-square block. According to an embodiment, the image decoding apparatus 100 may differently determine the probabilities of the bins for the split shape mode information, based on an area or a length of a long side of a current coding unit. According to an embodiment, the image decoding apparatus 100 may differently determine the probabilities of the bins for the split shape mode information, based on at least one of the area or the length of a long side of the current coding unit.

According to an embodiment, the image decoding apparatus 100 may determine that probabilities of bins for split shape mode information are the same with respect to coding units of a certain size or greater. For example, it may be determined that the probabilities of the bins for the split shape mode information are the same for coding units of a size of 64 samples or greater, based on the length of a long side of the coding unit.

According to an embodiment, the image decoding apparatus 100 may determine initial probabilities of the bins included in the bin string of the split shape mode information, based on a slice type (for example, an I-slice, a P-slice, or a B-slice).

FIG. 19 is a block diagram of an image encoding and decoding system 1900 performing loop filtering.

An encoding end 1910 of the image encoding and decoding system 1900 transmits an encoded bitstream of an image and a decoding end 1950 outputs a reconstructed image by receiving and decoding the bitstream. Here, the encoding end 1910 may have a similar configuration to the image encoding apparatus 200 described later, and the decoding end 1950 may have a similar configuration to the image decoding apparatus 100.

At the encoding end 1910, a prediction encoder 1915 outputs prediction data via inter prediction and intra prediction, and a transformer and quantizer 1920 outputs a quantized transform coefficient of residual data between the prediction data and a current input image. An entropy encoder 1925 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1930, and the data of the spatial domain is output as a reconstructed image via a deblocking filter 1935 and a loop filter 1940. The reconstructed image may be used as a reference image of a next input image via the prediction encoder 1915.

Encoded image data among the bitstream received by the decoding end 1950 is reconstructed as residual data of a spatial domain via an entropy decoder 1955 and an inverse quantizer and inverse transformer 1960. Image data of a spatial domain is configured when prediction data and residual data output from a prediction decoder 1975 are combined, and a deblocking filter 1965 and a loop filter 1970 may output a reconstructed image regarding a current original image by performing filtering on the image data of the spatial domain. The reconstructed image may be used by the prediction decoder 1975 as a reference image for a next original image.

The loop filter 1940 of the encoding end 1910 performs loop filtering by using filter information input according to a user input or system setting. The filter information used by the loop filter 1940 is output to the entropy encoder 1925 and transmitted to the decoding end 1950 together with the encoded image data. The loop filter 1970 of the decoding end 1950 may perform loop filtering based on the filter information input from the decoding end 1950.

The above-described various embodiments describe operations related to an image decoding method performed by the image decoding apparatus 100. Hereinafter, operations of the image encoding apparatus 200 performing an image encoding method corresponding to an inverse procedure of the image decoding method will be described via various embodiments.

Figure 2:
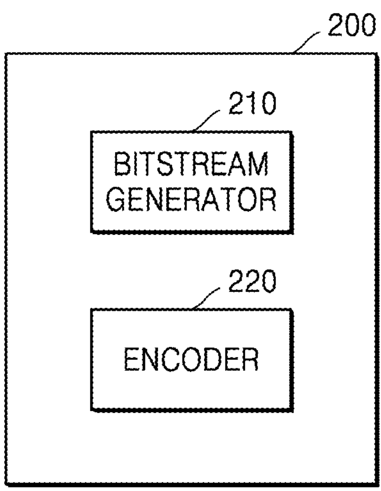
FIG. 2 is a block diagram of an image encoding apparatus according to an embodiment.

FIG. 2 is a block diagram of the image encoding apparatus 200 capable of encoding an image based on at least one of block shape information or split shape mode information, according to an embodiment.

The image encoding apparatus 200 may include an encoder 220 and a bitstream generator 210. The encoder 220 may receive an input image and encode the input image. The encoder 220 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, or a transform index. The encoder 220 may determine a context model based on block shape information including at least one of a shape, direction, ratio of width and height, or size of a coding unit.

The bitstream generator 210 may generate a bitstream based on the encoded input image. For example, the bitstream generator 210 may generate the bitstream by entropy-encoding the syntax element, based on the context model. Also, the image encoding apparatus 200 may transmit the bitstream to the image decoding apparatus 100.

According to an embodiment, the encoder 220 of the image encoding apparatus 200 may determine a shape of a coding unit. For example, the coding unit may have a square shape or a non-share shape, and information indicating such a shape may be included in block shape information.

According to an embodiment, the encoder 220 may determine a shape of a coding unit to be obtained as a result of splitting the coding unit. The encoder 220 may determine a shape of at least one coding unit included in the coding unit, and the bitstream generator 210 may generate a bitstream including split shape mode information including information about such a shape of the coding unit.

According to an embodiment, the encoder 220 may determine whether a coding unit is to be split or not to be split. When the encoder 220 determines that only one coding unit is included in the coding unit or that the coding unit is not split, the bitstream generator 210 may generate a bitstream including split shape mode information indicating that the coding unit is not split. Also, the encoder 220 may split the coding unit into a plurality of coding units, and the bitstream generator 210 may generate the bitstream including split shape mode information indicating that the coding unit is split into the plurality of coding units.

According to an embodiment, information indicating the number of coding units into which the coding unit is to be split or a direction of splitting the coding unit may be included in the split shape mode information. For example, the split shape mode information may indicate that the coding unit is split in at least one of a vertical direction or a horizontal direction or is not split.

The image encoding apparatus 200 determines information about a split shape mode, based on a split shape mode of a coding unit. The image encoding apparatus 200 may determine a context model based on at least one of a shape, direction, ratio of width and height, or size of a coding unit. Also, the image encoding apparatus 200 generates a bitstream including information about the split shape mode for splitting the coding unit based on the context model.

The image encoding apparatus 200 may obtain an array for mapping an index for the context model and at least one of the shape, direction, ratio of width and height, or size of the coding unit to determine the context model. The image encoding apparatus 200 may obtain, from the array, the index for the context model, based on at least one of the shape, direction, ratio of width and height, or size of the coding unit. The image encoding apparatus 200 may determine the context model, based on the index for the context model.

The image encoding apparatus 200 may determine the context model further based on block shape information including at least one of a shape, direction, ratio of width and height, or size of a neighboring coding unit adjacent to the coding unit, to determine the context model. Here, the neighboring coding unit may include at least one of a coding unit located at bottom left, left, top left, top, right, top right, or bottom right of the coding unit.

Also, the image encoding apparatus 200 may compare the length of width of the top neighboring coding unit and the length of width of the coding unit to determine the context model. Also, the image encoding apparatus 200 may compare the lengths of heights of the left and right neighboring coding units and the length of height of the coding unit. Also, the image encoding apparatus 200 may determine the context model, based on comparison results.

Because operations of the image encoding apparatus 200 include similar content to operations of the image decoding apparatus 100 described with reference to FIGS. 3 through 19, detailed descriptions thereof are not provided again.

Figure 20:
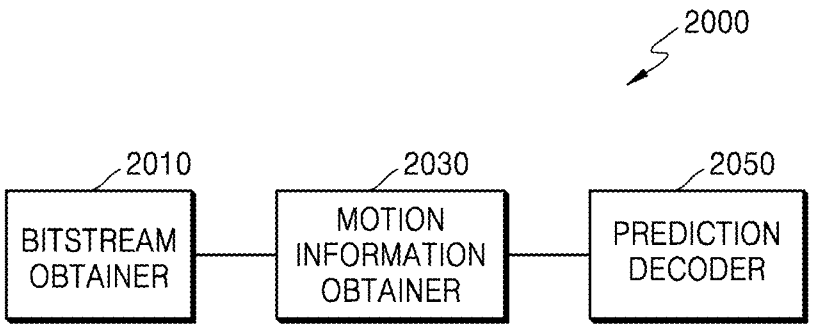
FIG. 20 is a block diagram of a configuration of an image decoding apparatus, according to an embodiment.

FIG. 20 is a block diagram of a configuration of an image decoding apparatus 2000, according to an embodiment.

Referring to FIG. 20, the image decoding apparatus 2000 includes a bitstream obtainer 2010, a motion information obtainer 2030, and a prediction decoder 2050.

The bitstream obtainer 2010 of FIG. 20 may correspond to the bitstream obtainer 110 of FIG. 1, and the motion information obtainer 2030 and the prediction decoder 2050 of FIG. 20 may correspond to the decoder 120 of FIG. 1.

The bitstream obtainer 2010, the motion information obtainer 2030, and the prediction decoder 2050 according to an embodiment may be embodied as at least one processor. The image decoding apparatus 2000 may include at least one memory storing input/output data of the bitstream obtainer 2010, the motion information obtainer 2030, and the prediction decoder 2050. The image decoding apparatus 2000 may include a memory controller for controlling data input and output of the at least one memory.

The bitstream obtainer 2010 obtains a bitstream generated as a result of encoding an image. The bitstream obtainer 2010 obtains, from the bitstream, syntax elements for decoding an image. Binary values corresponding to the syntax elements may be included in the bitstream according to a hierarchical structure of the image. The bitstream obtainer 2010 may obtain the syntax elements by entropy-coding the binary values included in the bitstream.

The bitstream may include information about a prediction mode of a current block in a current picture. The current block may denote a block of a largest coding unit, a coding unit, or a transform unit split from the current picture to be encoded or decoded.

The prediction mode of the current block may correspond to an intra prediction mode or an inter prediction mode. As described above, the inter prediction mode is a mode for reconstructing the current block from a reference block in a reference picture indicated by motion information of the current block. The motion information may include a prediction direction, a reference picture index, and a motion vector.

The prediction mode may be a uni-directional inter prediction or a bidirection inter prediction, and the uni-direction inter prediction is performed based on a first reference picture list (hereinafter “a list 0” or “a reference picture list 0”) or a second reference picture list (hereinafter “a list 1” or “a reference picture list 1”). The prediction direction may be one of a list 0 direction, a list 1 direction, and a bidirection. When the prediction direction is the list 0 direction, a picture included in a reference picture list 0 is used as a reference picture in the list 0 direction, and when the prediction direction is the list 1 direction, a picture included in a reference picture list 1 is used as a reference picture in the list 1 direction. Also, when the prediction direction is the bidirection, the picture included in the reference picture list 0 is used as the reference picture in the list 0 direction and the picture included in the reference picture list 1 is used as the reference picture in the list 1 direction.

The reference picture index indicates a picture used as a reference picture of the current block from among pictures included in the reference picture list 0 and/or the reference picture list 1. According to the reference picture index in the list 0 direction, a picture used as the reference picture in the list 0 direction is specified from among the pictures included in the reference picture list 0. Also, according to the reference picture index in the list 1 direction, a picture used as the reference picture in the list 1 direction is specified from among the pictures included in the reference picture list 1.

The motion vector specifies a location of the reference block in the reference picture. A motion vector in the list 0 direction denotes a motion vector indicating a reference block in the reference picture in the list 1 direction, and a motion vector in the list 1 direction denotes a motion vector indicating a reference block in the reference picture in the list 1 direction.

When the prediction direction of the current block is the list 0 direction, the motion information of the current block includes at least one of information indicating that the prediction direction of the current block is the list 0 direction, the reference picture index in the list 0 direction, or the motion vector in the list 0 direction. When the prediction direction of the current block is the list 1 direction, the motion information of the current block includes at least one of information indicating that the prediction direction of the current block is the list 1 direction, the reference picture index in the list 1 direction, or the motion vector in the list 1 direction. When the prediction direction of the current block is the bidirection, the motion information of the current block includes at least one of information indicating that the prediction direction of the current block is the bidirection, the reference picture index in the list 0 direction, the reference picture index in the list 1 direction, the motion vector in the list 0 direction, or the motion vector in the list 1 direction.

A merge mode (or a direct mode) is one of inter prediction modes. In the merge mode, motion information (e.g., motion parameters such as reference indexes and motion vectors) of a previous block (e.g., a spatial and temporal neighboring block of the current block) that is decoded before the current block, is used as the motion information of the current block. A bitrate may be reduced by including only information indicating the previous block to the bitstream instead of directly including the motion information of the current block to the bitstream.

Generally, in a candidate list including pieces of motion information of neighboring blocks as candidates, the number of candidates is pre-limited and similarity between the pieces of motion information of neighboring blocks and the motion information of the current block may not be high. Accordingly, even when an optimum candidate is selected from the candidate list, quality deterioration of a reconstructed block is inevitable when motion information of the selected candidate is different from the motion information of the current block.

According to an embodiment of the disclosure, after constructing the candidate list including the pieces of motion information of the neighboring blocks as candidates, the motion information of the neighboring block may be changed according to a certain standard to be used as the motion information of the current block. In other words, according to the embodiment of the disclosure, instead of using the motion information included in the candidate list as it is, the motion information in the candidate list may be changed according to the certain standard such that a difference between the reconstructed block and an original block is reduced.

When the prediction mode of the current block is a mode for deriving the motion information of the current block by using the motion information of the neighboring block, the bitstream obtainer 2010 obtains, from the bitstream, change information indicating whether to change the motion information of the neighboring block. The change information may indicate whether a change of the motion information of the neighboring block is required and when the change is required, indicate how the motion information is to be changed.

According to an embodiment, when information obtained from a higher level of the current block, for example, a sequence parameter set, a picture parameter set, a video parameter set, a slice header, a slice segment header, a tile header, or a tile group header of the bitstream, indicates non-application of a change mode, the bitstream obtainer 2010 may not obtain the change information of the current block from the bitstream and when the information indicates application of the change mode, the bitstream obtainer 2010 may obtain the change information of the current block from the bitstream.

According to an embodiment, even when the information obtained from the higher level of the current block indicates application of the change mode, the bitstream obtainer 2010 may not obtain the change information from the bitstream when the size of the current block is equal to or smaller than a pre-set size. When the size of the current block is small, a degree of quality improvement may be low compared to complexity of obtaining the motion information of the current block by changing the motion information of the neighboring block. The size of the current block may be calculated by multiplying a width and height of the current block or by adding the width and height of the current block.

When the change information indicates the change of the motion information of the neighboring block, the motion information obtainer 2030 obtains the motion information of the current block by changing the motion information of the neighboring block. On the other hand, when the change information indicates a non-change of the motion information of the neighboring block, the motion information obtainer 2030 may obtain the motion information of the current block without changing the motion information of the neighboring block. As described below, even when the change information indicates a change, the motion information of the neighboring block, in particular, at least one of a prediction direction, a reference picture, or a motion information, may not be changed. Also, even when the change information indicates a non-change, the motion information of the neighboring block, in particular, the motion vector, may be changed according to a differential motion vector obtained from the bitstream.

Before describing a method of changing the motion information of the neighboring block, a neighboring block spatially or temporally related to the current block will be described.

Figure 21:
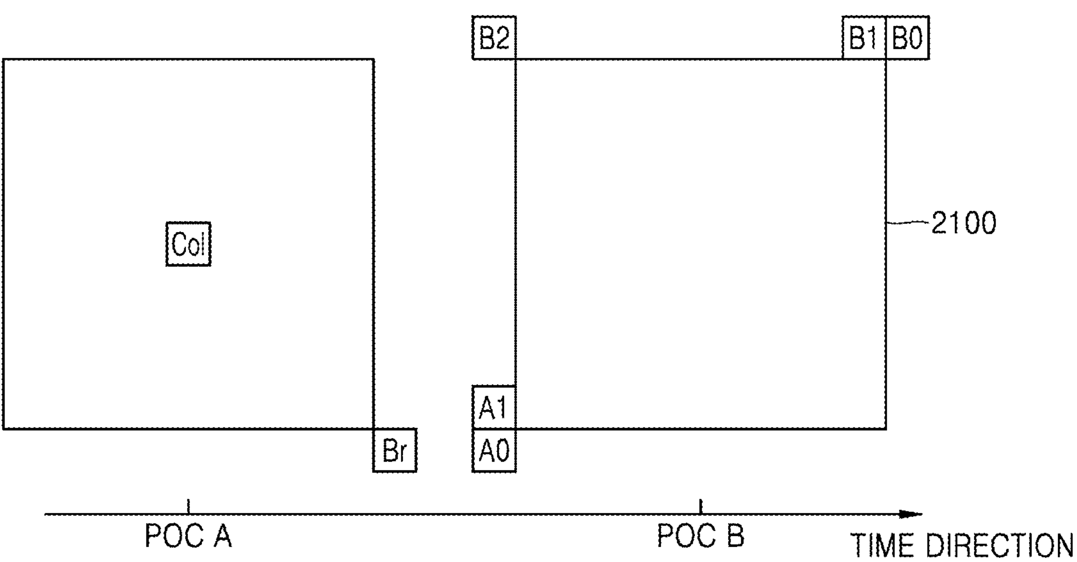
FIG. 21 is an exemplary diagram showing locations of neighboring blocks temporally or spatially related to a current block.

FIG. 21 is an exemplary diagram showing locations of neighboring blocks temporally or spatially related to a current block 2100.

Referring to FIG. 21, neighboring blocks of the current block 2100 may include spatial blocks spatially related to the current block 2100 and temporal blocks temporally related to the current block 2100.

The spatial blocks may include at least one of a lower left corner block A0, a lower left block A1, an upper right corner block B0, an upper right block B1, or an upper left corner block B2. As shown in FIG. 21, the lower left block A1 may be located above the lower left corner block A0 and the upper right block B1 may be located at the left of the upper right corner block B0.

The temporal block may include at least one of a block Col located at a same point as the current block 2100 in a collocated picture having a different picture order count (POC) from that of a current picture including the current block 2100, and a block Br spatially adjacent to the block Col located at the same point. The block Br may be located at the lower right of the block Col located at the same point as the current block 2100. The block Col located at the same point as the current block 2100 may be a block including a pixel corresponding to a center pixel in the current block 2100 from among pixels included in the collocated picture.

Locations of the temporal blocks and spatial blocks in FIG. 22 are only examples and the locations and numbers of temporal blocks and spatial blocks may vary according to embodiments.

The motion information obtainer 2030 may determine availability of the neighboring blocks according to a certain order and include motion information of the neighboring blocks to the candidate list sequentially depending on a result of the determination. The motion information obtainer 2030 may determine that an intra-predicted neighboring block does not have availability.

When the prediction mode of the current block is the mode for deriving the motion information of the current block by using the motion information of the neighboring block, the motion information obtainer 2030 may obtain motion information of one neighboring block from the candidate list and determine whether to change the motion information of the neighboring block and how to change the motion information, based on the change information.

When the change information indicates a change, the motion information of the neighboring block may be differently changed depending on a type of a higher block (for example, a picture, a tile, a slice, or a largest coding unit) including the current block. For example, when the higher block is a block (for example, a bi-predictive B-slice) capable of using both the reference picture list 0 and the reference picture list 1, the change information may indicate in which direction the prediction direction of the neighboring block is to be changed. As another example, when the higher block is a block (for example, a predictive P-slice) capable of using only the reference picture list 0, it is unable to select the prediction direction of the current block differently from the prediction direction of the neighboring block, and thus the change information may indicate how to change the reference picture and/or the motion vector of the neighboring block.

Hereinafter, a method of obtaining the motion information of the current block based on the change information when the higher block is the block capable of using both the reference picture list 0 and the reference picture list 1 will be described.

I. When Higher Block is Block Capable of Using Both Reference Picture List 0 and Reference Picture List 1

FIG. 22 is an exemplary table showing in which direction a prediction direction of a neighboring block is changed according to a value indicated by change information when a higher block is a block capable of using both a reference picture list 0 and a reference picture list 1.

Referring to FIG. 22, when change information mmvd_group_idx has a value of 0, motion information of the neighboring block is not changed. In other words, the prediction direction and a reference picture of the neighboring block are determined as a prediction direction and a reference picture of a current block. Then, a motion vector of the current block is obtained by applying a differential motion vector to a motion vector of the neighboring block. The motion information of the neighboring block is not changed even when the change information mmvd_group_idx is not included in a bitstream. In other words, the prediction direction and the reference picture of the neighboring block is determined as the prediction direction and the reference picture of the current block. Then, the motion vector of the current block is obtained by applying the differential motion vector to the motion vector of the neighboring block.

When the change information mmvd_group_idx has a value of 1 or 2, the motion information of the neighboring block is changed.

In particular, when the prediction direction of the neighboring block is a list 0 direction (L0) and the change information mmvd_group_idx has a value of 1, the prediction direction of the current block may be determined to be a bidirection (Bi), and when the change information mmvd_group_idx has a value of 2, the prediction direction of the current block may be determined to be a list 1 direction (L1).

Also, when the prediction direction of the neighboring block is the list 1 direction (L1) and the change information mmvd_group_idx has a value of 1, the prediction direction of the current block may be determined to be the bidirection (Bi), and when the change information mmvd_group_idx has a value of 2, the prediction direction of the current block may be determined to be the list 0 direction (L0).

Also, when the prediction direction of the neighboring block is the bidirection (Bi) and the change information mmvd_group_idx has a value of 1, the prediction direction of the current block may be determined to be the list 0 direction (L0), and when the change information mmvd_group_idx has a value of 2, the prediction direction of the current block may be determined to be the list 1 direction (L1).

A change direction of the prediction direction of the neighboring block according to the value of the change information mmvd_group_idx of FIG. 22 may be variously determined.

Hereinafter, a method of selecting the reference picture of the current block when the prediction direction of the neighboring block is changed will be described.

1. When Prediction Direction of Neighboring Block is Bidirection and Prediction Direction of Current Block is Unidirection When the prediction direction of the neighboring block is the bidirection and the prediction direction of the current block is the list 0 direction, a reference picture of the neighboring block in the list 0 direction is selected as the reference picture of the current block. A reference picture of the neighboring block in the list 1 direction is not used for the current block.

When the prediction direction of the neighboring block is the bidirection and the prediction direction of the current block is the list 1 direction, the reference picture of the neighboring block in the list 1 direction is selected as the reference picture of the current block. The reference picture of the neighboring block in the list 0 direction is not used for the current block.

2. When Prediction Direction of Neighboring Block is List 0 Direction and Prediction Direction of Current Block is List 1 Direction One of pictures included in a reference picture list 1 is selected as a reference picture of the current block in the list 1 direction, based on a distance between a current picture and the reference picture of the neighboring block in the list 0 direction. Here, a distance between pictures may be a difference of POCs between two pictures. A POC is an intrinsic value of a picture indicating an output order (e.g., a display order) of the picture.

According to an embodiment, the motion information obtainer 2030 may select, as the reference picture of the current block in the list 1 direction, a picture in the reference picture list 1 spaced apart from the current picture by the distance between the current picture and the reference picture of the neighboring block in the list 0 direction. When the distance between the current picture and the reference picture of the neighboring block in the list 0 direction is the same as a distance between the current picture and the reference picture of the current block in the list 1 direction, a scaling process of a motion vector described later may be omitted.

Referring to FIG. 23, when POC of the current picture is 5 and POC of the reference picture of the neighboring block in the list 0 direction is 3, a picture of POC 7 from among pictures included in the reference picture list 1 may be selected as the reference picture of the current block in the list 1 direction. When the picture spaced apart from the current picture by the distance between the current picture and the reference picture of the neighboring block in the list 0 direction is not included in the reference picture list 1, the motion information obtainer 2030 may select, as the reference picture of the current block in the list 1 direction, a picture having an index of a smallest value (for example, 0) from among the pictures in the reference picture list 1.

According to another embodiment, when the number of pictures included in the reference picture list 1 is greater than 1 and the distance between the current picture and the reference picture of the neighboring block in the list 0 direction is the same as a distance between the current picture and a picture having an index of 1 in the reference picture list 1, the motion information obtainer 2030 may select the picture having the index of 1 included in the reference picture list 1 as the reference picture of the current block in the list 1 direction. When the number of pictures included in the reference picture list 1 is not greater than 1, the motion information obtainer 2030 may select a picture having an index of 0 in the reference picture list 1 as the reference picture of the current block in the list 1 direction. When the number of pictures included in the reference picture list 1 is greater than 1 but the distance between the current picture and the reference picture of the neighboring block in the list 0 direction is not the same as the distance between the current picture and the picture having an index of 1 in the reference picture list 1, the motion information obtainer 2030 may select a picture having an index of 0 in the reference picture list 1 as the reference picture of the current block in the list 1 direction. In this case, POCs of the pictures included in the reference picture list 1 are not required to be all identified, and thus a process of selecting a reference picture may be simplified.

3. When Prediction Direction of Neighboring Block is List 1 Direction and Prediction Direction of Current Block is List 0 Direction One of pictures included in a reference picture list 0 is selected as a reference picture of a current block in the list 0 direction, based on a distance between a current picture and a reference picture of a neighboring block in the list 1 direction.

According to an embodiment, the motion information obtainer 2030 may select, as the reference picture of the current block in the list 0 direction, a picture in the reference picture list 0 spaced apart from the current picture by the distance between the current picture and the reference picture of the neighboring block in the list 1 direction.

Referring to FIG. 23, when POC of the current picture is 5 and POC of the reference picture of the neighboring block in the list 1 direction is 7, a picture of POC 3 from among the pictures included in the reference picture list 0 may be selected as the reference picture of the current block in the list 0 direction. When the picture spaced apart from the current picture by the distance between the current picture and the reference picture of the neighboring block in the list 1 direction is not included in the reference picture list 0, the motion information obtainer 2030 may select, as the reference picture of the current block in the list 0 direction, a picture having an index of a smallest value (for example, 0) from among the pictures in the reference picture list 0.

According to another embodiment, when the number of pictures included in the reference picture list 0 is greater than 1 and the distance between the current picture and the reference picture of the neighboring block in the list 1 direction is the same as a distance between the current picture and a picture having an index of 1 in the reference picture list 0, the motion information obtainer 2030 may select the picture having the index of 1 included in the reference picture list 0 as the reference picture of the current block in the list 0 direction. When the number of pictures included in the reference picture list 0 is not greater than 1, the motion information obtainer 2030 may select a picture having an index of 0 in the reference picture list 0 as the reference picture of the current block in the list 0 direction. When the number of pictures included in the reference picture list 0 is greater than 1 but the distance between the current picture and the reference picture of the neighboring block in the list 1 direction is not the same as the distance between the current picture and the picture having an index of 1 in the reference picture list 0, the motion information obtainer 2030 may select a picture having an index of 0 in the reference picture list 0 as the reference picture of the current block in the list 0 direction. In this case, POCs of the pictures included in the reference picture list 0 are not required to be all identified, and thus a process of selecting a reference picture may be simplified.

4. When Prediction Direction of Neighboring Block is List 0 Direction and Prediction Direction of Current Block is Bidirection A reference picture of a neighboring block in a list 0 direction is selected as a reference picture of a current block in the list 0 direction. Then, one of pictures included in a reference picture list 1 is selected as a reference picture of the current block in a list 1 direction, based on a distance between a current picture and the reference picture of the neighboring block in the list 0 direction. Because a method of selecting one of the pictures included in the reference picture list 1 as the reference picture of the current block in the list 1 direction, based on the distance between the current picture and the reference picture of the neighboring block in the list 0 direction, has been described with reference to "2. When prediction direction of neighboring block is in list 0 direction and prediction direction of current block is list 1 direction", detailed descriptions thereof are omitted.

5. When Prediction Direction of Neighboring Block is List 1 Direction and Prediction Direction of Current Block is Bidirection A reference picture of a neighboring block in a list 1 direction is selected as a reference picture of a current block in the list 1 direction. Then, one of pictures included in a reference picture list 0 is selected as a reference picture of the current block in a list 0 direction, based on a distance between a current picture and the reference picture of the neighboring block in the list 1 direction. Because a method of selecting one of the pictures included in the reference picture list 0 as the reference picture of the current block in the list 0 direction, based on the distance between the current picture and the reference picture of the neighboring block in the list 1 direction, has been described with reference to "3. When prediction direction of neighboring block is in list 1 direction and prediction direction of current block is list 0 direction", detailed descriptions thereof are omitted.

When a reference picture of a current block and a reference picture of a neighboring block are the same, a motion vector of the current block may be obtained by applying a differential motion vector to a motion vector of the neighboring block. In particular, when change information is not included in a bitstream or the change information indicates a non-change, the motion vector of the current block may be obtained by applying the differential motion vector to the motion vector of the neighboring block. When a prediction direction of the neighboring block is bidirection and a prediction direction of the current block is a list 0 direction or a list 1 direction, a motion vector of the current block in the list 0 direction or list 1 direction may be obtained by applying the differential motion vector to a motion vector of the neighboring block in the list 0 direction or list 1 direction.

When the reference picture of the current block and the reference picture of the neighboring block are not the same, the motion vector of the current block may be obtained by scaling the motion vector of the neighboring block and applying the differential motion vector to the scaled motion vector.

Hereinafter, a process of scaling the motion vector of the neighboring block will be described.

The motion information obtainer 2030 may scale the motion vector of the neighboring block by multiplying, to the motion vector of the neighboring block, a ratio of a distance between the reference picture of the neighboring block and a current picture to a distance between the reference picture of the current block and the current picture. The motion vector of the current block may be obtained by applying the differential motion vector to the scaled motion vector.

The motion information obtainer 2030 may change a sign of the scaled motion vector depending on a location relationship between the reference picture of the neighboring block, the current picture, and the reference picture of the current block as will be described with reference to FIGS. 24 and 25.

Figure 24:
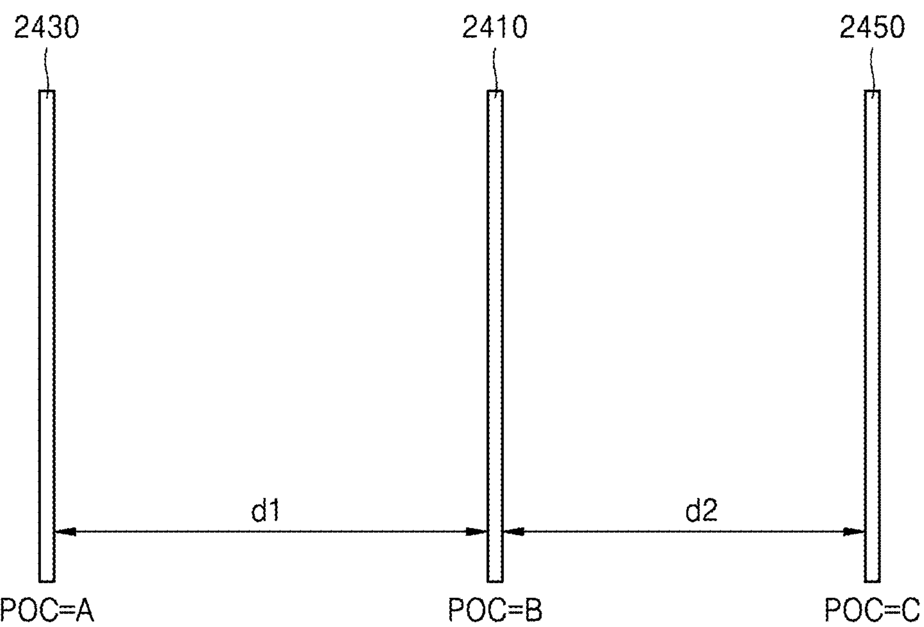
FIG. 24 is a diagram showing a location relationship between a reference picture of a neighboring block, a current picture, and a reference picture of a current block.
Figure 25:
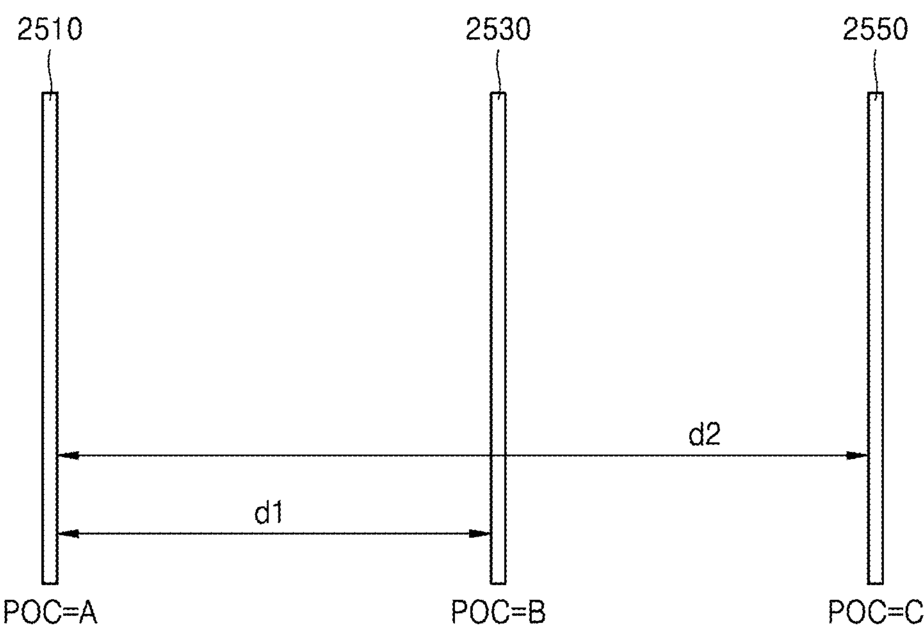
FIG. 25 is a diagram showing a location relationship between a reference picture of a neighboring block, a current picture, and a reference picture of a current block.

FIGS. 24 and 25 are diagrams showing location relationships between reference pictures 2430 and 2530 of neighboring blocks, current pictures 2410 and 2510, and reference pictures 2450 and 2550 of current blocks.

In FIGS. 24 and 25, distances between the current pictures 2410 and 2510 and the reference pictures 2430 and 2530 of the neighboring blocks will be referred to as d1 and distances between the current pictures 2410 and 2510 and the reference pictures 2450 and 2550 of the current blocks will be referred to as d2. A distance between pictures may denote a difference of POC values of two pictures.

Referring to FIG. 24, the current picture 2410 has a POC B, and the reference picture 2430 of the neighboring block and the reference picture 2450 of the current block respectively have a POC A and a POC C. When the POC B has a value between the POC A and the POC C, a motion vector of the neighboring block is scaled according to a ratio of d1 to d2 and a sign thereof is reversed. In other words, as shown in FIG. 24, when the current picture 2410 is located between the reference picture 2450 of the current block and the reference picture 2430 of the neighboring block, a sign of the scaled motion vector of the neighboring block is reversed. When values of d1 and d2 are the same, only the sign of the motion vector of the neighboring block is reversed.

Next, referring to FIG. 25, the current picture 2510 has a POC A, and the reference picture 2530 of the neighboring block and the reference picture 2550 of the current block respectively have a POC B and a POC C. When the POC A is smaller than the POC B and the POC C or is greater than the POC B and the POC C, the motion vector of the neighboring block is scaled according to the ratio of d1 to d2 and the sign thereof is maintained. In other words, as shown in FIG. 25, when the reference picture 2550 of the current block and the reference picture 2530 of the neighboring block are different from each other, the current picture 2510 is before the reference picture 2550 of the current block and the reference picture 2530 of the neighboring block in POC or after the reference picture 2550 of the current block and the reference picture 2530 of the neighboring block, the sign of the scaled motion vector of the neighboring block is maintained.

The motion information obtainer 2030 may obtain a motion information of the current block by applying a differential motion vector to the motion vector of the neighboring block or the scaled motion vector of the neighboring block.

According to an embodiment, the differential motion vector may be calculated from variation distance information and variation direction information, which are obtained from a bitstream. The bitstream obtainer 2010 may obtain the variation distance information and the variation direction information from the bitstream, and the motion information obtainer 2030 may apply the differential motion vector calculated based on the variation distance information and the variation direction information to the motion vector of the neighboring block or the scaled motion vector of the neighboring block.

The variation distance information may indicate a distance of the differential motion vector from an original point. Alternatively, the variation distance information may indicate a size of the differential motion vector. Here, a variation distance may be a distance of a sub-pixel unit, and for example, when a reference picture is interpolated to have a sub-pixel of a ¼ pixel unit and the variation distance information indicates a variation distance of 2, the differential motion vector may have a size of a 2/4 pixel unit.

The variation direction information may indicate in which direction the differential motion vector is spaced apart based on the original point. Alternatively, the variation direction information may indicate the sign of the differential motion vector.

Figure 26:
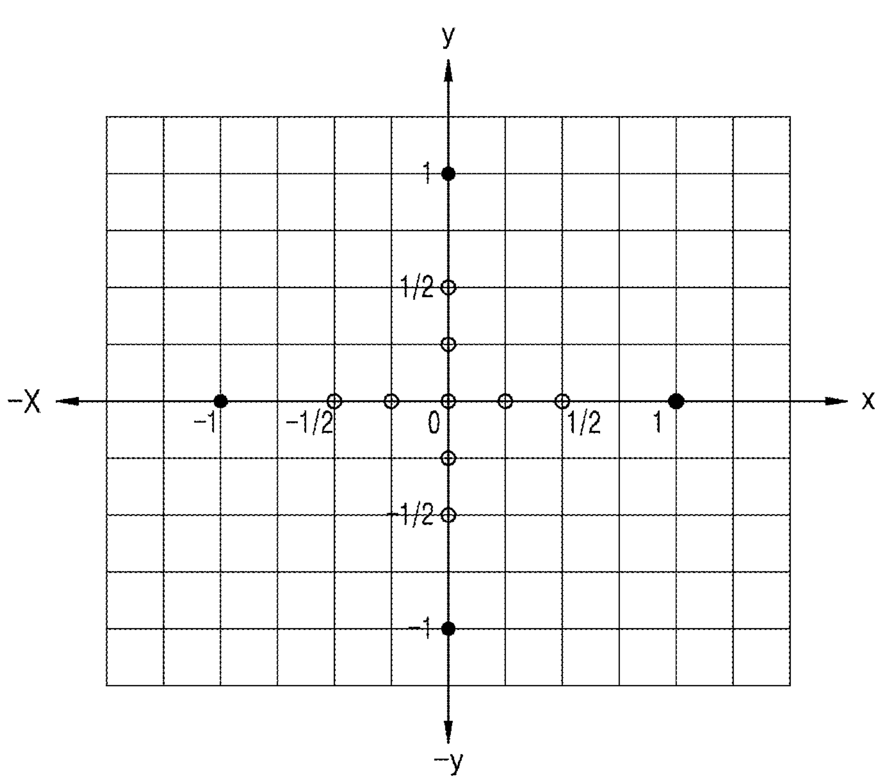
FIG. 26 is a diagram showing differential motion vectors displayed on a coordinate plane.

FIG. 26 is a diagram showing differential motion vectors displayed on a coordinate plane.

Based on an original point, a differential motion vector may have various values depending on a variation distance and a variation direction. For example, when the variation distance is 1 and the variation direction is a +x axis direction, a differential motion vector may be (1,0), and when the variation distance is 1 and the variation direction is −x axis direction, the differential motion vector may be (−1,0). Also, when the variation distance is 2 and the variation direction is a +y axis direction, a differential motion vector may be (0,2), and when the variation distance is 2 and the variation direction is −y axis direction, the differential motion vector may be (0, −2).

FIG. 27 is an exemplary table showing variation distances corresponding to values of variation distance information, and FIG. 28 is an exemplary table showing variation directions corresponding to values of variation direction information.

Referring to FIG. 27, a variation distance may be increased on a logarithmic scale in response to a value indicated by variation distance information mmvd_distance_idx increasing. For example, when the value indicated by the variation distance information mmvd_distance_idx is n, the variation distance may be 2n.

Referring to FIG. 28, a sign of a differential motion vector is determined depending on a value indicated by variation direction information mmvd_direction_idx. When the value indicated by the variation direction information mmvd_direction_idx is 0, a differential motion vector may have a positive (+) sign in an x axis direction and when the value indicated by the variation direction information mmvd_direction_idx is 1, the differential motion vector may have a negative (−) sign in the x axis direction. Also, when the value indicated by the variation direction information mmvd_direction_idx is 2, a differential motion vector may have a + sign in a y axis direction and when the value indicated by the variation direction information mmvd_direction_idx is 3, the differential motion vector may have a − sign in the y axis direction.

A variation distance according to a value indicated by variation distance information of FIG. 27 and a variation direction according to a value indicated by variation direction information of FIG. 28 may be variously determined according to embodiments.

According to an embodiment, when a prediction direction of a current block is bidirection, a differential motion vector derived from variation distance information and variation direction information may be applied to a motion vector of list 0 direction and a motion vector of a list 1 direction after being scaled. In particular, when a distance between a current picture and a reference picture of the current block in the list 0 direction is greater than a distance between the current picture and a reference picture of the current block in the list 1 direction, the differential motion vector may be applied to the motion vector in the list 0 direction after being scaled and the differential motion vector that is not scaled may be applied to the motion vector in the list 1 direction. On the other hand, when the distance between the current picture and the reference picture of the current block in the list 1 direction is greater than the distance between the current picture and the reference picture of the current block in the list 0 direction, the differential motion vector may be applied to the motion vector in the list 1 direction after being scaled and the differential motion vector that is not scaled may be applied to the motion vector in the list 0 direction.

The scaling of the differential motion vector may be performed based on a ratio of the distance between the current picture and the reference picture in the list 0 direction to the distance between the current picture and the reference picture in the list 1 direction. For example, when the distance between the current picture and the reference picture in the list 0 direction is do and the distance between the current picture and the reference picture in the list 1 direction is d1, d0/d1 may be multiplied to the differential motion vector. When a POC of the current picture has a value between a POC of the reference picture in the list 0 direction and a POC of the reference picture in the list 1 direction, a sign of the scaled differential motion vector may be reversed.

When the distance do between the current picture and the reference picture in the list 0 direction is the same as the distance d1 between the current picture and the reference picture in the list 1 direction and the POC of the current picture has a value between the POC of the reference picture in the list 0 direction and the POC of the reference picture in the list 1 direction, the differential motion vector derived from the variation distance information and the variation direction information may be applied to the motion vector in the list 0 direction and the differential motion vector of which the sign is reversed may be applied to the motion vector in the list 1 direction.

According to an embodiment, the scaling of the differential motion vector may be represented as Equation 1 below.

$$mMvdL=Clip3(-32767,32767,((distScaleFactor*mMvdL+16)>>5)) \quad [Equation\ 1]$$

In Equation 1, distScaleFactor denotes the ratio of the distance between the current picture and the reference picture in the list 0 direction to the distance between the current picture and the reference picture in the list 1 direction, and may be calculated according to Equation 2 below.

$$distScaleFactor=(Abs(currPocDiffL1)<<5)/Abs(currPocDiffL0) \quad [Equation\ 2]$$

In Equation 2, currPocDiffL1 denotes a POC difference between the current picture and the reference picture in the list 1 direction and currPocDiffL0 denotes a POC difference between the current picture and the reference picture in the list 0 direction.

In Equation 1, an upper limit and a lower limit of a clipping operation are respectively set to 32767 and −32767, wherein 32767 is the highest possible number representable by a 15-bit numeric part and a 1-bit sign part. Here, an actual lower limit representable by the 15-bit numeric part and the 1-bit sign part should be −32768. However, when the differential motion vector is determined to be −32768, i.e., the lower limit, via the clipping operation and the POC of the current picture has a value between the POC of the reference picture in the list 0 direction and the POC of the reference picture in the list 1 direction, a sign of −32768 needs to be reversed and in this case, 32767, which is the upper limit representable by the 15-bit numeric part and the 1-bit sign part, is exceeded. Accordingly, in Equation 1, the lower limit of the clipping operation is set to −32767. According to an embodiment, the lower limit of the clipping operation of Equation 1 may be set to −32768.

Hereinafter, a method of obtaining motion information of a current block considering change information when a type of a higher block of the current block is capable of using only a reference picture list 0 will be described.

II. When Higher Block is Block Capable of Using Reference Picture List 0

When a higher block is a block (for example, a predictive P-slice) capable of using only a reference picture list 0, a prediction direction of a current block is determined to be a list 0 direction. Change information indicates how a reference picture of a current picture is to be determined, as will be described with reference to FIG. 29.

FIG. 29 is a table for describing a method of selecting a reference picture ref_idx of a current block according to the number of pictures included in a reference picture list and a value indicated by change information mmvd_group_idx.

Referring to FIG. 29, when the change information mmvd_group_idx is 0, i.e., when the change information mmvd_group_idx indicates a non-change of motion information of a neighboring block, a reference picture ref_idx_curr of the neighboring block is selected as the reference picture ref_idx of the current block. Then, a motion vector of the current block is obtained by applying a differential motion vector is applied to a motion vector of the neighboring block.

When the change information mmvd_group_idx is 1 or 2, i.e., when the change information mmvd_group_idx indicates a change of the motion information of the neighboring block, the reference picture ref_idex of the current block is adaptively selected according to the number of pictures included in a reference picture list 0.

In particular, when the change information mmvd_group_idx is 1 and the number (active reference number) of pictures included in the reference picture list 0 is 1, the reference picture ref_idx of the current block is selected to be the same as the reference picture ref_idx_curr of the neighboring block. When the number (active reference number) of pictures included in the reference picture list 0 is not 1 (for example, is 2 or 3), the reference picture ref_idx of the current block is selected to be different from the reference picture ref_idx_curr of the neighboring block. For example, when the number (active reference number) of pictures included in the reference picture list 0 is 2 and one of the two pictures is the reference picture ref_idx_curr of the neighboring block, the other picture may be selected as the reference picture ref_idx of the current block.

When the change information mmvd_group_idx is 2 and the number (active reference number) of pictures included in the reference picture list 0 is less than 3 (for example, 2), the reference picture ref_idx of the current block is selected to be the same as the reference picture ref_idx_curr of the neighboring block. Because the reference picture ref_idx of the current block is selected to be different from the reference picture ref_idx_curr of the neighboring block when the change information mmvd_group_idx is 1 and the number (active reference number) of pictures included in the reference picture list 0 is 2, the reference picture ref_idx of the current block is selected to be the same as the reference picture ref_idx_curr of the neighboring block when the change information mmvd_group_idx is 2.

When the change information mmvd_group_idx is 2, the number (active reference number) of pictures included in the reference picture list 0 is 3 or greater, and an index of the reference picture ref_idx_curr of the neighboring block is less than 2, the reference picture ref_idx of the current block is selected to be a picture having an index of 2 from among the pictures included in the reference picture list 0. In other words, the reference picture ref_idx of the current block is selected to be different from the reference picture ref_idx_curr of the neighboring block.

When the change information mmvd_group_idx is 2, the number (active reference number) of pictures included in the reference picture list 0 is 3 or greater, and an index of the reference picture ref_idx_curr of the neighboring block is 2 or greater, the reference picture ref_idx of the current block is selected to be a picture having an index of 1 from among the pictures included in the reference picture list 0. In other words, when the index of reference picture ref_idx_curr of the neighboring block is 2, 3, 4, or the like, the reference picture ref_idx of the current block may be selected to be a picture having an index of 1.

In other words, when change information indicates a change and a reference picture list 0 includes a picture different from a reference picture of a neighboring block, a reference picture of a current block is selected to be different from the reference picture of the neighboring block first, but when the reference picture list 0 does not include a picture different from the reference picture of the neighboring block, the reference picture of the current block may be selected to be the same as the reference picture of the neighboring block.

When the change information indicates a change and the reference picture of the current block selected according to the change information is different from the reference picture of the neighboring block, a motion vector of the neighboring block is scaled and a differential motion vector is applied to the scaled motion vector to obtain a motion vector of the current block. Because a method of scaling the motion vector of the neighboring block in consideration of a ratio of a distance between a current picture and the reference picture of the current block to a distance between the current picture and the reference picture of the neighboring block when the reference picture of the current block is different from the reference picture of the neighboring block has been described above, detailed descriptions thereof are omitted.

When the change information indicates a change and the reference picture of the current block selected according to the change information is the same as the reference picture of the neighboring block, the motion information obtainer 2030 may apply an offset to the motion vector of the neighboring block to distinguish a case where the change information indicates a non-change, and apply the differential motion vector to the motion vector to which the offset is applied.

A method of changing the motion vector of the neighboring block by applying the offset to the motion vector of the neighboring block when the change information indicates a change and the reference picture of the current block and the reference picture of the neighboring block are the same will be described with reference to FIG. 30.

Figure 30:
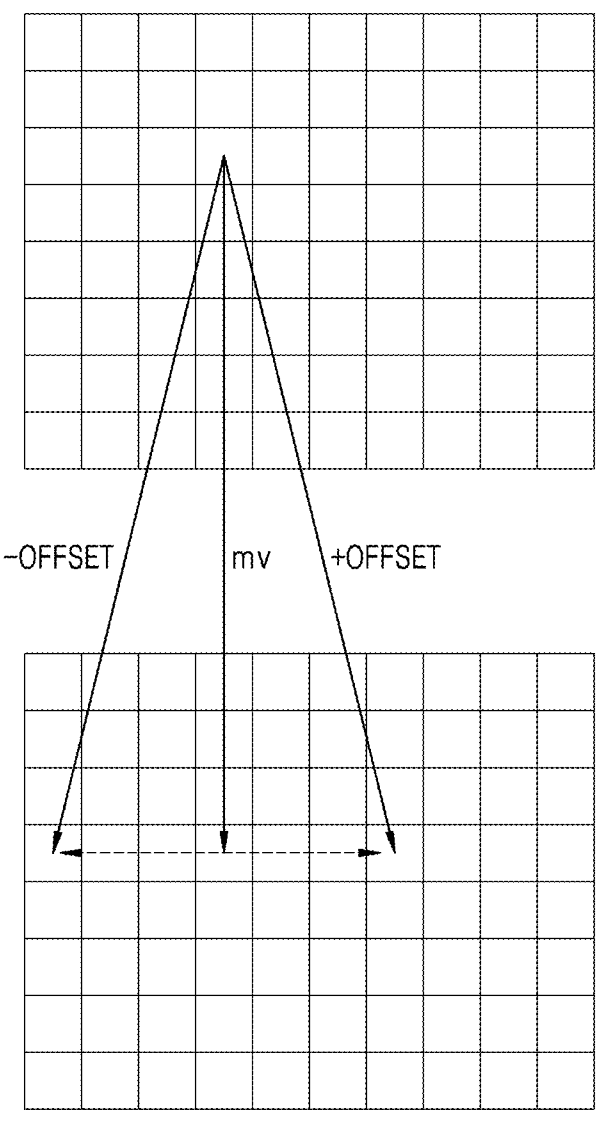
FIG. 30 is a diagram for describing a method of changing a motion vector of a neighboring block when a reference picture of the neighboring block and a reference picture of a current block are the same.

FIG. 30 is a diagram for describing a method of changing a motion vector mv of a neighboring block when a reference picture of the neighboring block and a reference picture of a current block are the same.

According to an embodiment, the motion information obtainer 2030 may change the motion vector mv of the neighboring block by adding an offset pre-set for at least one of an x component or a y component of the motion vector mv of the neighboring block. The offset may be a pre-determined real number.

According to an embodiment, the offset may be an odd number, for example, 3. It has been described above that a variation distance may increase on a logarithmic scale as values indicated by variation distance information increase, and in this case, the variation distance has a value of 2n. When an offset is set to an odd number, a result of adding a differential motion vector to a motion vector of a neighboring block to which the offset is not applied is inevitably different from a result of adding the differential motion vector to the motion vector of the neighboring block to which the offset is applied. In other words, candidates selectable as a motion vector of the current block may be diversified by applying an odd offset.

As shown in FIG. 30, the motion information obtainer 2030 may apply an offset of +3 or −3 to an x component of the motion vector mv of the neighboring block. When the offset of +3 or −3 is applied to the x component of the motion vector mv of the neighboring block, the motion vector mv of the neighboring block is shifted by a ¾ pixel unit when the reference picture is interpolated up to a ¼ pixel unit. According to an embodiment, the motion information obtainer 2030 may apply the offset of +3 or −3 to a y component of the motion vector mv of the neighboring block or apply the offset of +3 or −3 to the x component and the y component of the motion vector mv of the neighboring block.

The motion information obtainer 2030 may add +3 to the x component of the motion vector mv of the neighboring block when the number of pictures included in a reference picture list 0 is 1 and change information has a value of 1, and add −3 to the x component of the motion vector mv of the neighboring block when the change information has a value of 2.

Also, the motion information obtainer 2030 may scale the motion vector mv of the neighboring block because a reference picture of the current block is selected differently from a reference picture of the neighboring block when the number of pictures included in the reference picture list 0 is 2 and the change information has a value of 1. When the change information has a value of 2, the motion information obtainer 2030 may add +3 to the x component of the motion vector mv of the neighboring block.

Also, the motion information obtainer 2030 may scale the motion vector mv of the neighboring block because the reference picture of the current block is different from the reference picture of the neighboring block when the number of pictures included in the reference picture list 0 is 3 or more and the change information has a value of 1 or 2.

The motion information obtainer 2030 may obtain the motion vector of the current block by applying the differential motion vector after scaling the motion vector mv of the neighboring block or applying the offset to the motion vector mv of the neighboring block, according to the number of pictures included in the reference picture list 0 or the value indicated by the change information.

When motion information of the current block is obtained, the prediction decoder 2050 inter-predicts the current block according to the motion information of the current block. The prediction decoder 2050 may select a picture indicated by a reference picture index from among pictures included in a reference picture list corresponding to a prediction direction of the current block as the reference picture of the current block, and obtain a prediction block of the current block from a reference block in the reference picture of the current block indicated by the motion vector.

The prediction block of the current block may be determined as a reconstructed block of the current block, and when a bitstream includes residual data according to an embodiment, the reconstructed block of the current block may be obtained as the residual data is applied to the prediction block.

As described above, even when information obtained from a higher level of the current block indicates application of a change mode, the bitstream obtainer 2010 may not obtain the change information from the bitstream when the size of the current block is equal to or smaller than a pre-set size. In this case, to prevent bidirectional prediction in a small block, the motion information obtainer 2030 may determine the prediction direction of the current block to be a list 0 direction or a list 1 direction when a prediction direction of the neighboring block is bidirection. Accordingly, the motion information obtainer 2030 may determine a reference picture of the neighboring block in the list 0 direction or a reference picture of the neighboring block in the list 1 direction as the reference picture of the current block and obtain the motion vector of the current block by applying the differential motion vector to the motion vector mv of the neighboring block. In other words, according to an embodiment, when the size of the current block is small, the current block may be unidirectionally predicted even when the prediction direction of the neighboring block is bidirection.

Figure 31:
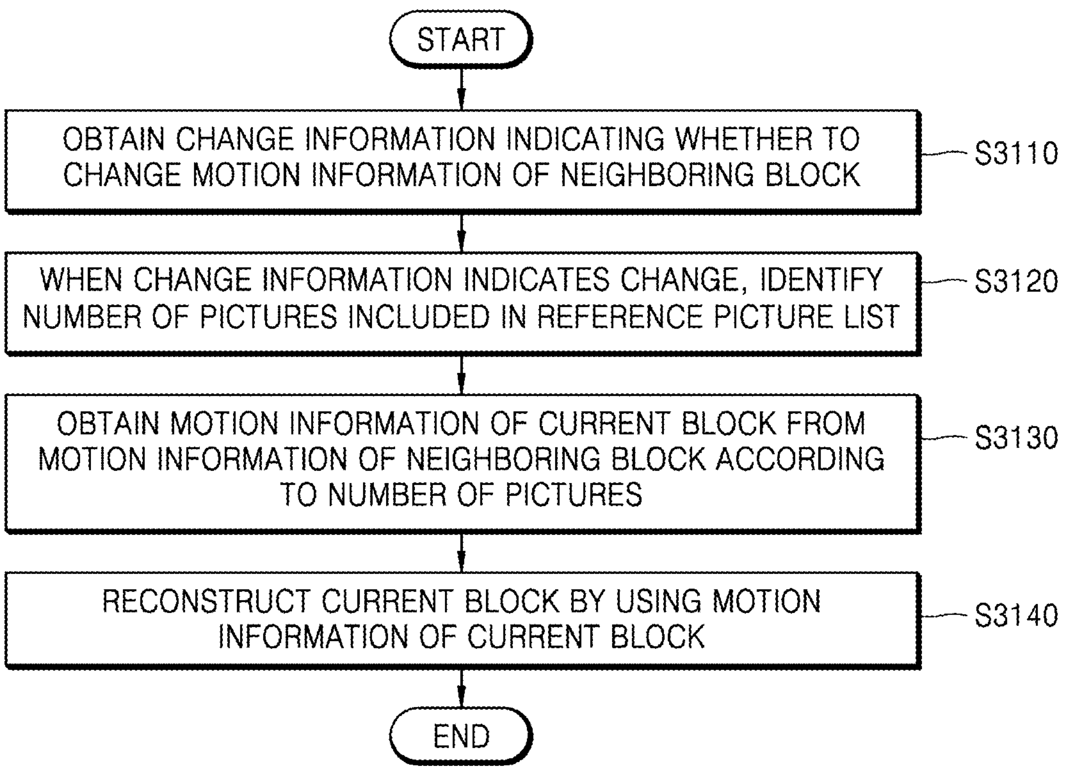
FIG. 31 is a flowchart of a method of decoding motion information, according to an embodiment.

FIG. 31 is a flowchart of a method of decoding motion information, according to an embodiment.

In operation S3110, the image decoding apparatus 2000 obtains, from a bitstream, change information indicating a change of motion information of a neighboring block temporally or spatially related to a current block.

According to an embodiment, when information obtained from a higher level of the current block, for example, a sequence parameter set, a picture parameter set, a video parameter set, a slice header, a slice segment header, a tile header, or a tile group header of the bitstream, indicates non-application of a change mode, the image decoding apparatus 2000 may not obtain the change information of the current block from the bitstream and when the information indicates application of the change mode, the image decoding apparatus 2000 may obtain the change information of the current block from the bitstream.

According to an embodiment, even when the information obtained from the higher level of the current block indicates application of the change mode, the image decoding apparatus 2000 may not obtain the change information from the bitstream when the size of the current block is equal to or smaller than a pre-set size. In this case, when a prediction direction of the neighboring block is bidirection, the image decoding apparatus 2000 may determine a prediction direction of the current block to be a list 0 direction or a list 1 direction. Then, the image decoding apparatus 2000 may determine a reference picture of the neighboring block in the list 0 direction or a reference picture of the neighboring block in the list 1 direction as the reference picture of the current block and obtain a motion vector of the current block by applying a differential motion vector to a motion vector of the neighboring block.

In operation S3120, when the change information indicates a change of the motion information and the higher block of the current block is able to use one reference picture list, i.e., when the higher block of the current block is unable to use two reference picture lists, the image decoding apparatus 2000 identifies the number of pictures included in the reference picture list.

According to an embodiment, when the change information indicates a change of the motion information and the higher block of the current block is able to use two reference picture lists, the image decoding apparatus 2000 changes a prediction direction of the neighboring block according to the change information. The changed prediction direction of the neighboring block may be selected as a prediction direction of the current block. In other words, the prediction direction of the current block may be determined according to the change information.

In operation S3130, the image decoding apparatus 2000 may obtain motion information of the current block from the motion information of the neighboring block according to the number of pictures in the reference picture list.

In particular, the image decoding apparatus 2000 selects the reference picture of the neighboring block or a picture different from the reference picture of the neighboring block as the reference picture of the current block, depending on the number of pictures in the reference picture list. Then, when the reference picture of the neighboring block is selected as the reference picture of the current block, the image decoding apparatus 2000 obtains a motion vector of the current block by applying an offset to at least one of an x-component or a y-component of the motion vector of the neighboring block. The image decoding apparatus 2000 may obtain the motion vector of the current block by applying the differential motion vector to the motion vector to which the offset is applied.

When the number of pictures in the reference picture list is 1, the image decoding apparatus 2000 may select the reference picture of the neighboring block as the reference picture of the current block. When the change information indicates a first type change (for example, when the change information has a value of 1), the image decoding apparatus 2000 may apply an offset of a positive (+) sign to the motion vector of the neighboring block. When the change information indicates a second type change (for example, when the change information has a value of 2), the image decoding apparatus 2000 may apply an offset of a negative (−) sign to the motion vector of the neighboring block.

When the number of pictures in the reference picture list is 2 and the change information indicates the first type change, the image decoding apparatus 2000 may determine the reference picture of the current block to be different from the reference picture of the neighboring block and scale the motion vector of the neighboring block. When the number of pictures in the reference picture list is 2 and the change information indicates the second type change, the image decoding apparatus 2000 may determine the reference picture of the current block to be the same as the reference picture of the neighboring block and apply the offset to at least one of the x component or the y component of the motion vector of the neighboring block.

When the number of pictures in the reference picture list is 3 or more and the change information indicates the first type change or the second type change, the image decoding apparatus 2000 may determine the reference picture of the current block to be different from the reference picture of the neighboring block and scale the motion vector of the neighboring block. Here, the reference picture of the current block may be differently selected depending on when the change information indicates the first type change and when the change information indicates the second type change.

When the change information indicates a change of the motion information and the higher block of the current block is able to use two reference picture lists, the image decoding apparatus 2000 may select the reference picture of the current block considering the prediction direction of the current block, and scale the motion vector of the neighboring block according to a ratio of a distance between a current picture and the reference picture of the current block to a distance between the current picture and the reference picture of the neighboring block.

The image decoding apparatus 2000 may obtain the motion vector of the current block by applying the differential motion vector to the motion vector of the neighboring block, the scaled motion vector of the neighboring block, or the motion vector of the neighboring block to which the offset is applied.

In operation S3140, the image decoding apparatus 2000 reconstructs the current block by using the motion information of the current block.

The image decoding apparatus 2000 may select a picture indicated by a reference picture index from among the pictures included in the reference picture list corresponding to the prediction direction of the current block as the reference picture of the current block, and obtain a prediction block of the current block from a reference block in the reference picture of the current block indicated by the motion vector.

According to an embodiment, the prediction block of the current block may be determined as a reconstructed block of the current block, and when a bitstream includes residual data according to an embodiment, the reconstructed block of the current block may be obtained as the residual data is applied to the prediction block.

Figure 32:
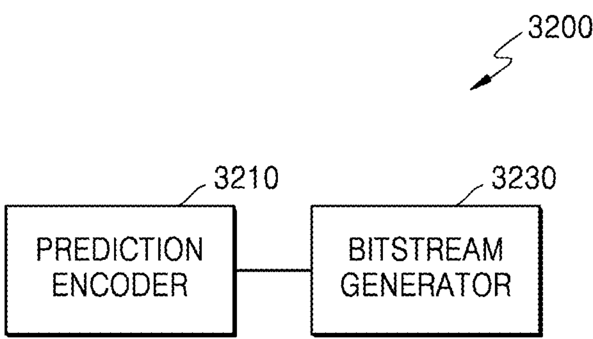
FIG. 32 is a block diagram of a configuration of an image encoding apparatus, according to an embodiment.

FIG. 32 is a block diagram of a configuration of an image encoding apparatus 3200, according to an embodiment.

Referring to FIG. 32, the image encoding apparatus 3200 includes a prediction encoder 3210 and a bitstream generator 3230. The prediction encoder 3210 may correspond to the encoder 220 of FIG. 2 and the bitstream generator 3230 may correspond to the bitstream generator 210 of FIG. 2.

The prediction encoder 3210 and the bitstream generator 3230 according to an embodiment may be embodied as at least one processor. The image encoding apparatus 3200 may include at least one memory where input and output data of the prediction encoder 3210 and the bitstream generator 3230 is stored. Also, the image encoding apparatus 3200 may include a memory controller for controlling data input and output of the at least one memory.

The prediction encoder 3210 encodes an image according to a prediction mode and the bitstream generator 3230 generates a bitstream including information generated as a result of encoding the image.

The prediction encoder 3210 may determine a prediction mode of a current block in a current image. When the prediction mode of the current block is determined as an inter prediction mode, the bitstream generator 3230 includes information indicating motion information of the current block to the bitstream.

When the prediction mode of the current block is a mode for deriving the motion information of the current block from motion information of a neighboring block, the prediction encoder 3210 builds a candidate list including pieces of motion information of neighboring blocks temporally or spatially related to the current block, as candidates. The prediction encoder 3210 may derive the motion information of the current block by selecting one of the pieces of motion information included in the candidate list.

The prediction encoder 3210 may determine whether it is possible to apply a change mode on blocks included in a higher block (for example, a picture sequence, a picture, a video, a slice, a slice segment, or a tile) of the current block in the higher block. When it is possible to apply the change mode on the blocks included in the higher block, the prediction encoder 3210 may determine whether to change the motion information of the neighboring block to derive the motion information of the current block.

According to an embodiment, when the size of the current block is smaller than or equal to a pre-set size, the prediction encoder 3210 may determine not to change the motion information of the neighboring block even when it is possible to apply the change mode on the blocks included in the higher block.

When it is determined not to change the motion information of the neighboring block, the prediction encoder 3210 may obtain, as a differential motion vector, a difference between the motion vector of the neighboring block and the motion vector of the current block. The, the bitstream generator 3230 may generate a bitstream including change information indicating a non-change of the motion information of the neighboring block, information indicating one of the candidates included in the candidate list, and information indicating the differential motion vector.

When it is determined to change the motion information of the neighboring block, the prediction encoder 3210 may determine how to change the motion information of the neighboring block considering whether the number of reference picture lists usable by the higher block including the current block is 1 or 2.

As described above, when the higher block is able to use only a reference picture list 0, the prediction encoder 3210 may select the reference picture of the current block considering the number of pictures included in the reference picture list 0.

When the higher block is able to use the reference picture list 0 and a reference picture list 1, the prediction encoder 3210 may determine in which direction the prediction direction of the neighboring block is to be changed and select the reference picture of the current block considering the prediction direction of the neighboring block, a change direction, and the reference picture of the neighboring block.

A method of selecting the reference picture of the current block when the higher block is able to use only the reference picture list 0 and when the higher block is able to use the reference picture list 0 and the reference picture list 1 has been described in detail with reference to the image decoding apparatus 2000, and thus detailed descriptions thereof are omitted.

When the higher block is able to use only the reference picture list 0 and the reference picture of the current block and the reference picture of the neighboring block are the same, the prediction encoder 3210 may apply an offset to at least one of an x component and a y component of the motion vector of the neighboring block.

When the higher block is able to use only the reference picture list 0 and the reference picture of the current block and the reference picture of the neighboring block are different from each other, the prediction encoder 3210 may scale the motion vector of the neighboring block according to a ratio of a distance between a current picture and the reference picture of the neighboring block to a distance between the current picture and the reference picture of the current block.

Also, when the higher block is able to use the reference picture list 0 and the reference picture list 1, and the reference picture of the current block and the reference picture of the neighboring block are different from each other, the prediction encoder 3210 may scale the motion vector of the neighboring block according to the ratio of the distance between a current picture and the reference picture of the neighboring block to the distance between the current picture and the reference picture of the current block.

The prediction encoder 3210 may obtain the differential motion vector that is a difference between motion vector of the current block and the motion vector of the neighboring block, the scaled motion vector of the neighboring block, or the motion vector of the neighboring block to which the offset is applied.

The bitstream generator 3230 may generate the bitstream including, as the motion information of the current block, information indicating the neighboring block, change information indicating whether to change the motion information of the neighboring block and how to change the motion information of the neighboring block, and information indicating the differential motion vector. When the size of the current block is equal to or smaller than the pre-set size, the change information may not be included in the bitstream.

According to an embodiment, the information indicating the differential motion vector may include variation distance information and variation direction information.

Figure 33:
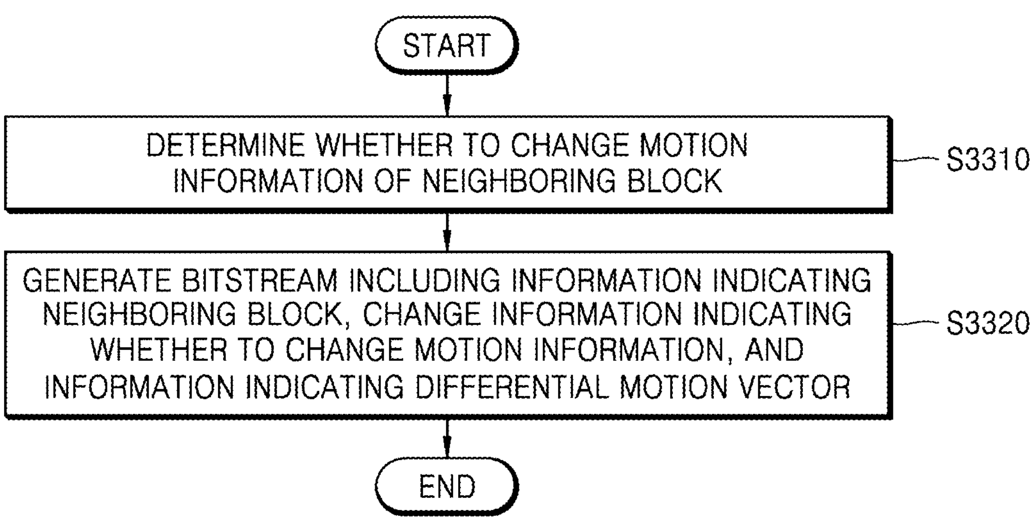
FIG. 33 is a flowchart of a method of encoding motion information, according to an embodiment.

FIG. 33 is a flowchart of a method of encoding motion information, according to an embodiment.

In operation S3310, the image encoding apparatus 3200 determines whether to change motion information of a neighboring block temporally or spatially related to a current block to derive a motion vector of the current block.

According to an embodiment, the image encoding apparatus 3200 may determine whether it is possible to apply a change mode in a higher level, for example, a picture sequence, a picture, a video, a slice, a slice segment, or a tile, of the current block, and when it is determined that the change mode is applicable in the higher level, determine whether to change the motion information of the neighboring block to obtain motion information of the current block.

According to an embodiment, even when it is determined that the change mode is applicable in the higher level of the current block, the image encoding apparatus 3200 may determine not to change the motion information of the neighboring block when the size of the current block is equal to or smaller than a pre-set size.

In operation S3320, the image encoding apparatus 3200 may generate a bitstream including information indicating a neighboring block used to derive the motion information of the current block from among neighboring blocks, information indicating whether to change the motion information of the neighboring block, and information indicating a differential motion vector. The change information may not be included in the bitstream when it is determined that the change mode is not applicable in the higher level or the size of the current block is equal to or smaller than the pre-set size.

The image encoding apparatus 3200 may obtain, as the differential motion vector, a difference between motion vector of the current block and the motion vector of the neighboring block, the scaled motion vector of the neighboring block, or the motion vector of the neighboring block to which the offset is applied. The image encoding apparatus 3200 may include variation distance information and variation direction information indicating the differential motion vector to the bitstream.

Meanwhile, the embodiments described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

While one or more embodiments have been described with reference to the figures, it will be understood by those of ordinary skill in the art that various changes in form and details may be made therein without departing from the spirit and scope as defined by the following claims.

What is claimed is:

1. A method, performed by a decoding apparatus, of decoding motion information, the method comprising:

obtaining, from a bitstream, information indicating whether motion information of a neighboring block is changed for obtaining a motion vector of a current block, the information representing index information indicating one of a first value, a second value or a third value;

when the information indicates a change of the motion information of the neighboring block, obtaining the motion vector of the current block using a motion vector of the neighboring block, a pre-defined offset for at least one of a x-component or a y-component of the motion vector of the neighboring block, and a differential motion vector; and reconstructing the current block by using a reference block indicated by the motion vector of the current block in a reference picture of the current block, wherein obtaining the motion vector of the current block comprises:

applying the offset to the at least one of the x-component or the y-component of the motion vector of the neighboring block; and obtaining the motion vector of the current block by adding the differential motion vector to the motion vector of the neighboring block to which the offset is applied, wherein, when the information indicates the third value, it is determined not to change the motion information of the neighboring block, and when the information indicates the first value or the second value, it is determined to change the motion information of the neighboring block, wherein, when the information indicates the first value, the offset has a + sign, and when the information indicates the second value, the offset has a – sign, and wherein the differential motion vector is derived from variation distance information and variation direction information included in the bitstream.

2. An apparatus for decoding motion information, the apparatus comprising:

a bitstream obtainer configured to obtain, from a bitstream, information indicating whether motion information of a neighboring block is changed for obtaining a motion vector of a current block, the information representing index information indicating one of a first value, a second value or a third value;

a motion information obtainer configured to obtain the motion vector of the current block using a motion vector of the neighboring block, a pre-defined offset for at least one of a x-component or a y-component of the motion vector of the neighboring block, and a differential motion vector when the information indicates a change of the motion information of the neighboring block; and a prediction decoder configured to reconstruct the current block by using a reference block indicated by the motion vector of the current block in a reference picture of the current block, wherein the motion information obtainer further configured to:

apply the offset to the at least one of the x-component or the y-component of the motion vector of the neighboring block; and obtain the motion vector of the current block by adding the differential motion vector to the motion vector of the neighboring block to which the offset is applied, wherein, when the information indicates the third value, it is determined not to change the motion information of the neighboring block, and when the information indicates the first value or the second value, it is determined to change the motion information of the neighboring block, wherein, when the information indicates the first value, the offset has a + sign, and when the information indicates the second value, the offset has a − sign, and wherein the differential motion vector is derived from variation distance information and variation direction information included in the bitstream.

3. A method, performed by an encoding apparatus, of encoding motion information, the method comprising:

determining whether to change motion information of a neighboring block for obtaining a differential motion vector of a current block;

when it is determined to change the motion information of the neighboring block, obtaining a differential motion vector using a motion vector of the neighboring block, a pre-defined offset for at least one of a x-component or a y-component of the motion vector of the neighboring block, and a motion vector of the current block; and generating a bitstream comprising first information indicating whether the motion information of the neighboring block is changed, and second information indicating the differential motion vector, wherein obtaining the differential motion vector comprises:

applying the offset to the at least one of the x-component or the y-component of the motion vector of the neighboring block; and obtaining the differential motion vector by subtracting the motion vector of the neighboring block to which the offset is applied from the motion vector of the current block, wherein the first information represents index information indicating one of a first value, a second value or a third value, wherein, when it is determined not to change the motion information of the neighboring block, the first information indicates the third value, and when it is determined to change the motion information of the neighboring block, the first information indicates the first value or the second value, wherein, when the offset has a + sign, the first information indicates the first value, and when the offset has a − sign, the first information indicates the second value, and wherein the second information includes variation distance information and variation direction information.

4. An apparatus for encoding motion information, the apparatus comprising:

a prediction encoder configured to:

determine whether to change motion information of a neighboring block for obtaining a differential motion vector of a current block; and when it is determined to change the motion information of the neighboring block, obtain the differential motion vector using a motion vector of the neighboring block, a pre-defined offset for at least one of a x-component or a y-component of the motion vector of the neighboring block, and a motion vector of the current block; and a bitstream generator configured to generate a bitstream comprising first information indicating whether the motion information of the neighboring block is changed, and second information indicating the differential motion vector, wherein the prediction encoder further configured to:

apply the offset to the at least one of the x-component or the y-component of the motion vector of the neighboring block; and obtain the differential motion vector by subtracting the motion vector of the neighboring block to which the offset is applied from the motion vector of the current block, wherein the first information represents index information indicating one of a first value, a second value or a third value, wherein, when it is determined not to change the motion information of the neighboring block, the first information indicates the third value, and when it is determined to change the motion information of the neighboring block, the first information indicates the first value or the second value, wherein, when the offset has a + sign, the first information indicates the first value, and when the offset has a − sign, the first information indicates the second value, and wherein the second information includes variation distance information and variation direction information.

5. A method of transmitting a bitstream generated by an image encoding apparatus, the image encoding apparatus comprising:

a prediction encoder configured to:

determine whether to change motion information of a neighboring block for obtaining a differential motion vector of a current block; and when it is determined to change the motion information of the neighboring block, obtain the differential motion vector using a motion vector of the neighboring block, a pre-defined offset for at least one of a x-component or a y-component of the motion vector of the neighboring block, and a motion vector of the current block; and a bitstream generator configured to generate the bitstream comprising first information indicating whether the motion information of the neighboring block is changed, and second information indicating the differential motion vector, wherein the prediction encoder further configured to:

apply the offset to the at least one of the x-component or the y-component of the motion vector of the neighboring block; and obtain the differential motion vector by subtracting the motion vector of the neighboring block to which the offset is applied from the motion vector of the current block, wherein the first information represents index information indicating one of a first value, a second value or a third value, wherein, when it is determined not to change the motion information of the neighboring block, the first information indicates the third value, and when it is determined to change the motion information of the neighboring block, the first information indicates the first value or the second value, wherein, when the offset has a + sign, the first information indicates the first value, and when the offset has a − sign, the first information indicates the second value, and wherein the second information includes variation distance information and variation direction information.

* * * * *